US008521172B2

(12) United States Patent
Rosenau

(10) Patent No.: US 8,521,172 B2
(45) Date of Patent: Aug. 27, 2013

(54) METHOD AND SYSTEM FOR SWITCHING CELLULAR BASE STATION CAPACITY

(76) Inventor: Scott R. Rosenau, Chesterton, IN (US)

( * ) Notice: Subject to any disclaimer, the term of this patent is extended or adjusted under 35 U.S.C. 154(b) by 430 days.

(21) Appl. No.: 12/930,554

(22) Filed: Jan. 11, 2011

(65) Prior Publication Data

US 2012/0178483 A1  Jul. 12, 2012

(51) Int. Cl.
*H04W 72/00* (2009.01)
*H04W 28/16* (2009.01)
*H04W 40/04* (2009.01)

(52) U.S. Cl.
USPC ........... 455/445; 455/424; 455/450; 455/509; 455/561

(58) Field of Classification Search
None
See application file for complete search history.

(56) References Cited

U.S. PATENT DOCUMENTS

| | | | |
|---|---|---|---|
| 5,805,996 A | 9/1998 | Salmela | |
| 5,852,778 A | 12/1998 | Labedz | |
| 5,854,986 A | 12/1998 | Dorren et al. | |
| 5,861,844 A | 1/1999 | Gilmore et al. | |
| 5,890,067 A | 3/1999 | Rui | |
| 6,594,496 B2 | 7/2003 | Schwartz | |
| 2005/0026616 A1* | 2/2005 | Cavalli et al. | 455/436 |
| 2007/0249340 A1* | 10/2007 | Hiltunen et al. | 455/433 |

* cited by examiner

*Primary Examiner* — Philip Sobutka
(74) *Attorney, Agent, or Firm* — Thomas J. Schab

(57) ABSTRACT

A radio capacity management system (RCMS) and method are adapted to integrate within an existing network of cells that form a local cellular wireless communications network. The RCMS is not limited by the types or number of sites that form the cellular wireless communications network. Such sites have idle, redundant RF radio channel resources. The RCMS reallocates idle RF resources between the network of cells whether those resources are redundant or not. Reallocations are based on a dynamic, as-need basis or on historical quality-of-service data specific to each cell. The RCMS includes a master capacity management (MCMS) system that continuously communicates with a base station controller which provides resource capacity data from each site to the MCMS. The MCMS uses this date to determine when a cell requires additional radio transceiver capacity and where the capacity will be reallocated from.

52 Claims, 15 Drawing Sheets

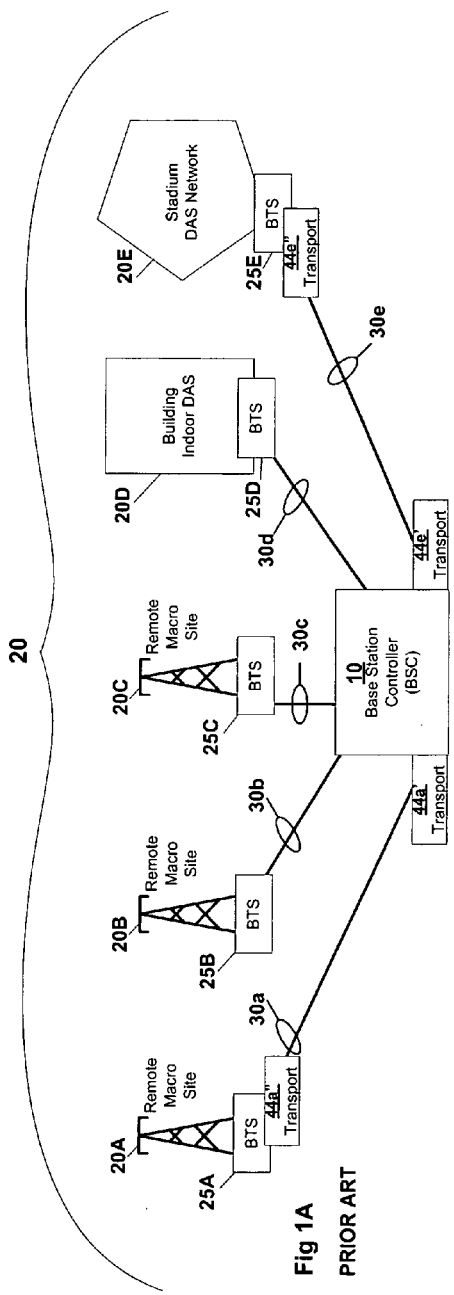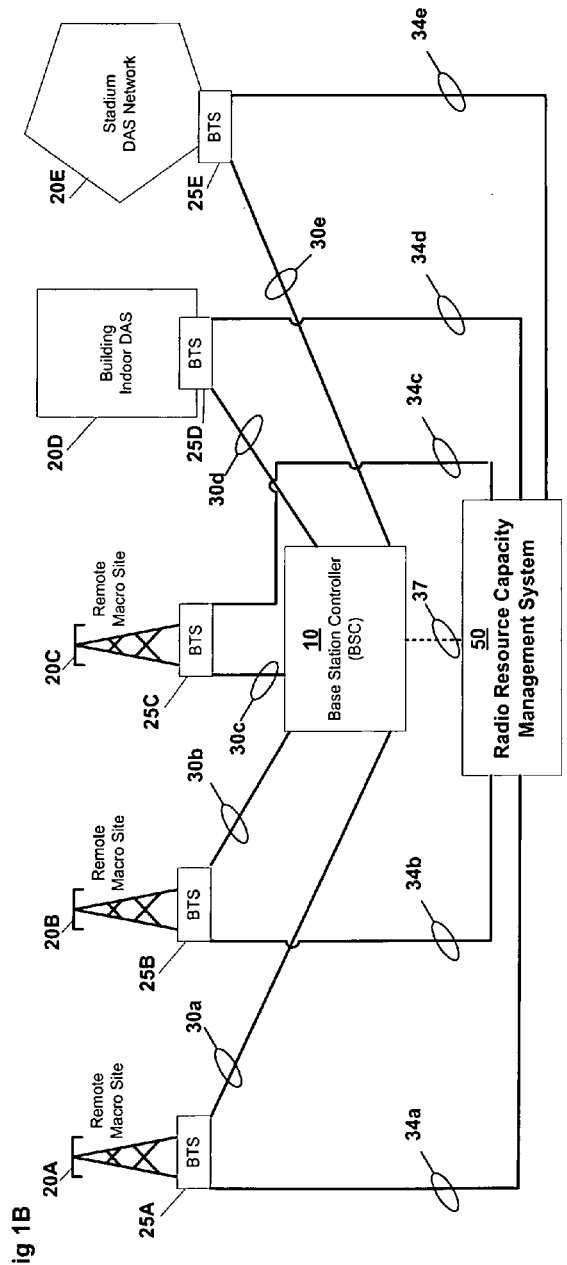
Fig 1A PRIOR ART
Fig 1B

METHOD AND SYSTEM FOR SWITCHING CELLULAR BASE STATION CAPACITY

FIELD OF THE INVENTION

The present invention relates to cellular wireless communication radio access networks (RAN) and more particularly to a method and a system for temporarily reallocating radio channel resources from any of the base transceiver stations (BTS) that are dedicated to serve a particular geographic service area or cells that comprise the RAN, to a different cell or cells within the RAN that require additional radio channel capacity for a predetermined period of time. The invention may reallocate the radio channel resources between multiple macro site cells or with distributive antenna system (DAS) networks incorporated as part of the RAN and may even reallocate radio channel resources to a neighboring RAN. With the present invention, the need for expensive, redundant radio channel resource capacity is eliminated.

BACKGROUND OF THE INVENTION

Demand within the wireless cellular communications industry has increased such that according to the International Association for the Wireless Telecommunications Industry, the wireless penetration rate in the United States went from 34% of the total U.S. population in 2000, to 93% in June of 2010, while annualized total wireless revenues increased from $68.3 billion in June of 2000, to 255.8 billion in June of 2010. Likewise, annualized total wireless data revenues have increased from $139.4 million in June of 2000, to $46.8 billion in June of 2010. This data overwhelmingly demonstrates that wireless data utilization has escalated substantially, thereby forcing the industry to satisfy ever-increasing demands for speedier services and increasing system capacities.

In typical cellular wireless communication systems, geographic service areas are divided into coverage areas called cells. A cell can be further divided into more defined and compact areas called sectors. The cell and its associated sectors are served by a cellular base transceiver station (hereinafter BTS) which facilitates RF radio frequency communication between the mobile communication devices (cell phones) and the telephone network and/or data network, known as the internet. A typical BTS comprises multiple RF radio transceiver units and antennas that provide bi-directional RF communication links, known as traffic channels, to and from the mobile communication devices. The antennas that are connected to the BTS facilitate the transmission and receipt of the RF signals that pass within a cell or sector. Such antennas are typically positioned outdoors on cellular towers or they may be placed on the tops or sides of buildings; they may even be placed at various strategic locations within the buildings. The BTS radio transceiver hardware and its corresponding capacity is also strategically located in order to maximize cellular communications coverage over large geographical areas and/or to serve a very large number of cellular users. Each BTS is typically connected to a base station controller (hereinafter BSC) which monitors and controls all of the RF activity within its connected network and is further communicatively coupled to the telephone or data network via backhaul connections. A backhaul connection is a form of a signal transport means such as a coaxial cable wiring, a fiber optic cable wiring, or even microwave point-to-point transceivers. With fiber optic backhaul connections, the transmitted RF signal is first modulated into a light signal and then sent through single or multi-mode fiber optic cable. At the far end of the fiber, the optical signal is reconverted to the original RF signal. With microwave point-to-point backhaul connections, the transmitted RF signal is first digitized into a microwave signal which is then transmitted along a connection of radio point-to-point links where the original RF signal has been modulated and/or digitized. The digitized microwave signal is reconverted at the far end to the original RF signal. Microwave or fiber optic backhaul connections can also be used to digitize the RF signal for encapsulation prior to transmitting the signal through the internet. Any transport mechanism that reproduces the original input RF signal at an end point could be considered backhaul transport.

The increased demand for additional cellular capacity has also required that the radio resource channel capacity of each BTS be matched to the cell size profile of the particular cell in which the BTS is located. The current industry method for matching cell capacity is to physically provide each BTS with overly redundant radio channel resources so that peak demands of a network will always be satisfied when those needs arise. However, the cost of the redundant radio transceiver hardware is extremely expensive, as are the costs of maintaining the transceiver hardware. As a means of tempering the need for additional BTS cell coverage, the industry commonly uses RF repeaters in each BTS, also known as "over the air" repeaters, which effectively extend the range of a particular cell's coverage area where the BTS was located.

Another means used in the industry for extending a base transceiver station's coverage area while simultaneously increasing a network's system capacity without resorting to the provision of redundancy has involved the diversification of the antenna systems themselves. One trend has been to avoid the very tall, stand-alone cellular antenna towers for a variety of reasons. One reason is that many cities and municipalities now regulate the height and location of the towers, making their installation an impossibility in some service areas. Another reason is related to the fact that large, stand-alone towers require high power amplifiers to transmit the radiated signal into various geographical areas without compromising the signal. To overcome those problems, a more recent industry trend is to use physically shorter cell towers because they operate at lower power levels, which favorably facilitates RF traffic channel code signal re-use. Another recent industry trend is to utilize multi-tiered towers as a means of fine tuning the coverage area within each cell in accordance with the implementation environment. For example, macro cells are regarded as cells where the base station antenna is installed on a mast or on a building, but above the average roof top level. Micro cells are cells whose base station antenna is installed anywhere where the height of the antenna is under the average roof top level; micro cells are the typical application in urban areas. Another form of a micro cell is that of a distributed antenna system (hereinafter DAS). With a DAS system, a plurality of interconnected antennas are connected to the cell's BTS by the various transport mechanisms that were mentioned above, such as a coaxial cable, fiber optic cable, point-to-point microwave, etc., as a means to extend the BTS coverage area far from the intended originating cell site. Even though a DAS system is typically used in outdoor applications, it is not uncommon to employ a DAS system within the interiors of high-rise office buildings. In this way, the capacity demands that are solely originating from within that particular building can be more readily satisfied without the need for redundant transceiver capacity at the BTS. Of course, some service providers will also dedicate redundant BTS equipment within that office building in addition to employing a DAS system. Another form of fining tuning a coverage area involves the implementation of pico cells, which are small capacity cells whose coverage diameter is a few dozen meters and where the antennas are mainly located inside a building. Thus, it should be appreciated that by using different antenna heights, as well as DAS antenna systems, the capacity needs in a particular service area can be theoretically being met throughout the peak service needs of the day. Although the antenna systems and their utilizations have effectively extended the coverage areas of a BTS, the BTS itself only has a fixed amount of usable RF radio channel resource capacity. As it currently stands, that capacity cannot be transferred or shared between cells to increase the capacity of a BTS associated with a cell or a DAS system. Thus, the current form of allocating traffic capacity in any particular cell is considered static.

Wireless cellular service operators strive to provide the ideal wireless cellular network, where all of their cellular users can readily access the network. This ideal situation presents a common issue to all service providers where, at certain locations and at certain times of the day, many more users are attempting to access the network than at other periods during the day. A prime example is the problem of dealing with rush hour capacity overload. This particular peak time of the day requires more capacity resources along the major transportation routes in order to provide quality service to their commuting users. That additional capacity almost always comes in the form of redundant radio transceiver resources being provided to the BTS that neighbors the transportation routes. Alternatively, at non-peak hours during the day, these redundant RF radio channel resources sit idle. Unfortunately, this idle capacity is in the form of very costly redundant radio transceiver hardware that is physically located onsite in almost all of the network base transceiver stations. Moreover, even if the ideal wireless cellular network is not provided, the users expect an acceptable quality of service (QoS) throughout the entire day. The quality of service, or QoS, is the capability of a cellular service provide to provide what is considered a satisfactory level of service. That expected threshold level of service includes immediate access to the cellular network system, adequate voice quality, consistent signal strength, a very low rate of call blocking, a low rate of dropping probability, and high data rates for multimedia and data applications. System-wide quality of service performance is so important to the various cellular service providers that they employ RF traffic engineers to continuously study these aspects of service quality and generate QoS data reports that relate to a service provider's entire wireless cellular network system. These reports are reviewed daily by the engineers to determine if and when a particular cell or sector is experiencing unacceptable levels of QoS due to insufficient RF radio transceiver hardware capacities within that cell or sector.

The above mentioned shortfalls and the progression of the various means for extending BTS coverage and/or capacity is the result of the evolution of the cellular industry itself. That evolution began with what was known then as the advanced mobile phone system (AMPS). This was an analog radio system that used frequency-division multiple access (FDMA) technology. A major shortfall of this system was that it could only hold one cellular phone call per frequency channel. In short order, that system was later improved with the introduction of the narrow band AMPS (NAMPS). That system increased capacity by using only one third of the AMPS channel width per phone call, which effectively allowed three phone calls within the same AMPS band width. The next major system break through in capacity gains was realized with the introduction of the digital cellular system. That system typically uses some type of phase modulation to send and receive digital signal information rather than analog signal information. Modulation format advancements in all later systems have become increasingly complex in order to get as much capacity out of the available frequency bandwidth as possible. In this early digital system, the first common digital format used by service providers was the time-division-multiple-access, also known by those in the art as TDMA (hereinafter TDMA). TDMA represents an access method for shared medium networks whereby users are allowed to share the same frequency channel by dividing the radio frequency signal into discrete time slots so that the modulated signal within each time slot can be transmitted in rapid succession. This methodology increases system capacity because it allows multiple radio frequency base stations to share the same transmission medium, or radio frequency channel, while using only a part of that station's channel capacity. The TDMA methodology is used in digital 2G cellular systems such as global system for mobile communications (hereinafter GSM), IS-136, personal digital cellular (PDC), and iDEN. Those in the art readily are familiar with each of those TDMA formats, therefore, they will not be further explained. The GSM format was one of the most popular 2G systems and it was actually a hybrid of the TDMA and FDMA technologies. With GSM, a 200 KHz-wide frequency channel is provided so that up to eight cell phone users could use the same frequency channel at the same time. However, the newest TDMA technology which is related to GSM, is currently being phased out of service by all of the major service providers such as Sprint, AT&T, etc., because of new system advances. Furthermore, because of the deceasing use of this format, only a few manufacturers are still supplying transceiver equipment based on that technology. All of the above-mentioned technologies are considered narrow band RF technologies since they rely upon the same basic concept of FM radio.

The next advance over the GSM technology was that known as CDMAOne, which is a 2G CDMA digital air interface standard that operates on a 1.23-1.25 MHz wide channel. CDMA is unlike TDMA or FDMA as this system is entirely a spread-spectrum, code derived, time-dependent system for transmitting information rather than being based on a system that transmits codes within certain timeslots on a designated frequency channel. The Walsh code is the term used for the industry assignment of digital modulation codes that are used for separating individual conversations from control signals on the RF carrier that is transmitted from a CDMAOne (2G) base transceiver station. This code uniquely identifies each of the traffic channels or user conversations. In CDMAOne (2G), the only way to address individual user channels within a transmission is to demodulate the RF wideband spread-spectrum signal and then to detect that channel's individual Walsh codes. The Walsh codes consist of the Pilot, Paging, Sync, and traffic channels. The Pilot channel is always assigned the Walsh code 0, while the Paging channels are found on one or more Walsh codes 1-7. The Sync channel is always assigned Walsh Code 32, while all remaining Walsh codes are assigned to the traffic channels. A PN Offset, also called a Pilot PN, is one of the 512 short code sequences that are used to differentiate between the various sectors that are assigned to a base station transceiver for communication with mobile units.

The CDMAOne (2G) system has now evolved into the more advanced 3G technology, known as CDMA2000, which is the first 3G technology to be deployed. This technology is still based upon a wide band spread-spectrum RF signal that is code-based and time sensitive and it was deployed in three phases: the first being 1xRTT (radio transmission technology), the second being 1xEV-DO (Evolution Data Optimized), and the third being CDMA2000 3x. Each of these phases facilitated even more capacity and faster data rates. The most recent technologies, known as WiMax and Long Term Evolution (LTE), are currently being marketed and are considered 4G technologies. These 4G technologies use Orthogonal Frequency Division Multiplex (OFDM) as their modulation format. As was mentioned above, the modulation schemes of each of these advancing technologies continues to become more and more complex in their attempt at providing even larger capacities and data speeds. Regardless of these improvements, these technologies are very similar to the CDMA format in that they all use wideband spread-spectrum formats and codes, now called symbols, as the basis to arrive at their traffic channels. Furthermore, they are highly time-dependent, which requires the use of global positioning systems (hereinafter GPS) to synchronize the system's transmission times.

As the cellular wireless industry has evolved, several inventive solutions were offered to address the shortfalls that plagued the cellular communications field at that particular time in the field's evolution. For example, in Salmela, U.S. Pat. No. 5,805,996, issued Sep. 8, 1998, a method was proposed for enhancing coverage to specific areas within a cell by adjusting the direction of one or more of its antennas. In this patent, traffic channels from a low-demand cell are steered to a high-demand cell by redirecting the antenna in the high-demand cell towards the low-demand cell. In a limited sense, this additional capacity was provided by the high-demand cell as that cell's BTS capacity was already capable of taking on the additional traffic. However, this patent failed to provide a method of actually transferring BTS capacity to another cell. In Doren, U.S. Pat. No. 5,854,986, issued Dec. 29, 1998, a method was disclosed for coupling a plurality of radio transceivers to low power distributed antennas (DAS). The object of this method was specifically directed towards providing coverage to confined areas with overly high capacity demands and alternatively, to provide coverage to low capacity areas. These confined high and low demand areas typically represent service areas that a normal cell site would not be adequately provide sufficient service coverage. In Doren, the coupling of the BTS equipment capacity is predetermined statically during installation. Therefore, this method does not offer a dynamic solution towards meeting capacity demand needs which are continuously changing during the course of a day or because of a special event or situation that creates an instant demand for additional capacity, such as when a very large number of cellular users are concentrated into one area because of that event or situation. In Labedz, U.S. Pat. No. 5,852,778, issued Dec. 22, 1998, a method was disclosed using the CDMA technology format whereby cells could expand their coverage into a cell that has coverage area holes that are caused by a malfunctioning radio transmitter in that cell. This method was not founded on fluctuating traffic considerations nor did it solve the problem of providing additional BTS radio channel transceiver capacity to address dynamic coverage demands. In Gilmore, U.S. Pat. No. 5,861,844, issued Jan. 19, 1999, a method was disclosed where a combiner array and an RF switch matrix were used to combine the antenna path of a failed radio transceiver with that of the antenna path of a functioning radio transceiver. The combining of the antenna elements provided temporary radio transceiver coverage until a replacement for the failed unit was installed. Therefore, this method was only concerned with offering a level of reliability that there would be some form of temporary coverage within a cell, but it did not address a way to guarantee that all of the radio channel capacity of the malfunctioning cell would be met by the relied-upon cell. In Rui, U.S. Pat. No. 5,890,067, issued Mar. 30, 1999, a method was disclosed that involved the use of centralized, narrow beam antennas that followed the mobile cellular user. Differing antenna beam widths were employed to provide zones of coverage for low, medium, and high density traffic. In this and in Salmela's invention, the capacity improvements were limited since the radio transceiver capacity was being steered locally within a single cell or sector, very similar to what is known as a smart antenna. Finally, in Schwartz, U.S. Pat. No. 6,594,496, which was issued Jul. 25, 2003, a method was disclosed for re-routing centralized base station RF radio transceiver channel resources to adjacent cells that required additional capacity. Schwartz provided its own form a centralized base station controller that continually monitored and gathered specific information on interconnected base station traffic. Based on that information, the controller would then switch resources to a networked cell in need of additional capacity as long as the resources were not restricted. One shortfall of this patent was that it was designed around the narrow band technologies of analog and possibly TDMA, which was in its early stages at that point of time. As mentioned above, analog technologies are now non-existent and have not been deployed for over a decade, and TDMA technologies are quickly being phased out of service by the major service providers who are now employing the higher capacity technologies such as CDMA. Furthermore, the number of physical RF radio channels that can be grouped together in RF re-use plans are finite, thereby severely limiting the amount of actual transferred capacity that can be realized. Those in the field understand that with today's CDMA-based 3G and 4G technologies, the issues of co-channel, adjacent channel, or neighbor-cell frequency interference are no longer a concern, as it was in Schwartz, since the current technology formats of all service providers use the same frequencies, system wide. Of course, each service provider is assigned a unique frequency band or bands within which his system must be operated. Unlike Schwartz, there is no longer the need to incorporate a frequency plan to manage cell resource allocation and/or sharing since a common frequency is used by all of the base transceiver stations within a cellular network. In addition, each provider may have multiple-wide band frequencies that they control and operate, but those frequencies do not interfere with each other since the current technology formats are based on traffic codes rather than on traffic frequencies which have to be managed and accounted for. Novice RF and system engineers in today's CDMA and CDMA-like technologies fully understand that a base station controller (hereinafter BSC) would require inputting of the specific Walsh codes that are defined for the base transceiver station that is to receive the reallocated resources and for all of the base transceiver stations that neighbor that base transceiver station. The inputting of the Walsh codes would have to take place prior to the reallocation in order to ensure that the added codes are being considered as additional capacity and not code interferers by the BSC and of all of the affected base transceiver stations as being by the reallocation. If these codes were added to the base transceiver stations which now use the most-current technology formats without the BSC first completing the necessary code definition work, the ability of all of the affected base transceiver stations to provide a certain quality of service would be gravely compromised since there would be a significant rise in the signal-to-noise thresholds in the entire RF area served by that BSC. A rise in the signal-to-noise threshold would result in dropped calls, call failures and cause severe call interference. Thus, it should be appreciated that the Schwartz methodology and technology could not be applied to today's CDMA technology or to CDMA-like technology, or to the latest (OFDM) type formats. Otherwise, greater and more serious operational problems would occur when compared to the problem of not having enough radio channel resource capacity in a particular cell. Since Schwartz fails to teach or even mention that certain fundamentals which are related to today's technology formats must be accounted for prior to radio channel resource reallocation, the Schwartz methodology and hardware would not be able to transfer resources to another cell without experiencing severe system degradation. Therefore, Schwartz offers no viable solution for capacity reallocation with the CDMA and CDMA-like technology formats that are universally being used by all major wireless service providers today.

Moreover, Schwartz also fails to address network reallocation time delays, which is another extremely critical aspect that requires consideration with today's technologies. It well known that a time delay will occur when transmitting RF signals or data from one location to another, regardless of the types of backhaul connections within the cellular network. These timing errors usually occur when the signal propagation delay is too long and they must be accounted for within the cellular network in order to prevent call failures on any call handing in or handing out of the cell. Such delays may result for a number of different reasons but the majority of the delays are caused by the number and types of signal conditioners that are utilized within the cellular network. For example, with CDMA2000 (3G), all base transceiver stations must be synchronized within a few microseconds of each other in order for the BTS station identification mechanisms (Walsh codes) to work. Because of these time delay sensitivities, the CDMA2000 network, as well as the WiMax, LTE, and future 4G technologies, all depend upon GPS to maintain a very precise clocking within the cellular network BTS hardware. The GPS time stamp clocking system provides a very precise timing function for synchronization and decoding of the RF modulating technology schemes. In the case of an expected and overly long timing delay, special timing delay codes, known as PN Offset codes, are introduced into the network's BSC as a means to account for the long delays. Sometimes the received PN Offset codes or the timing of the BTS's short codes relative to the system time, may be different from that of the value designated on the Sync channel. When that occurs, a handoff will fail or a call initiation will not be completed. Phones or data devices already using the cell site can remain on the air because they derive their timing from the signals transmitted by the base station. However, phones that are using other cell sites or sectors may be prevented from using an intended target site resource because the cellular devices will be confused by the error in frequency. This error creates what is known in the art as the "island cell" effect. By itself, the network cell is still functional, but to the rest of the system, that cell is inaccessible. In that case, the island cell effect would be caused by timing delays from the addition of the donor RF radio channel resources to the existing resources of the base transceiver station that is being targeted for additional capacity since the donor RF transmission or backhaul retransmission signal would induce too great a time of arrival differential for the user device to use that added RF resource. The only way to avoid the island cell effect is to compensate for the timing delay prior to the reallocation of the resources.

The center piece of the Schwartz patent is its specially designed controller and algorithms, and it is evident that the Schwartz controller was designed for use with an analog and/or TDMA format technology since Schwartz is trying to manage the individual traffic channels as a means to optimize overall system performance. Although managing individual traffic channels may have been possible with the old format technologies like analog and TDMA, that same method is not possible when using current formats such as CDMA or CDMA-like technologies. With the current formats, there is no known way of separating the individual traffic codes from an RF carrier and then uniting those codes at another location since the code's encryptions and decryptions are based on the donor PN short codes, Sync codes, and Long codes. Thus, without the inclusion of those codes, there is no known way to decode the reallocated radio channel resources. In other words, the entire RF resource would have to be switched, including the PN, Sync, and Long codes, as well as the traffic channels, which to date, is not possible. Therefore, those in the field who are familiar with the type of traffic resources being used today would understand that switching those resources from one BTS cell to another would never be possible using the methodologies being taught by Schwartz. This is due to the fact that Schwartz fails to account for the signal-to-noise threshold considerations that are related to the code additions, fails to account for inherent equipment and RF transmission time delays prior to the reallocation of capacity resources to the target BTS, and has basic controller traffic channel management issues. In fact, none of the above-mentioned patents address the need to configure the network BSC with the critical Walsh code and time delay information before making the reallocation of radio channel resources. As previously emphasized, with the presently-used CDMA and CDMA-like technologies, the RF radio channel resources that are being reallocated, require that the timing delays of RF transmission and/or re-transmission of the sector-specific codes have to be accounted for by the BSC prior to putting those codes into service. If not accounted for, code signal-to-noise threshold interference issues will be introduced into the network and the network will experience a severe degradation in the quality of service for the cell receiving the reallocated resources and that cell's neighboring cells.

Therefore, a need currently exists for a system and methodology that can identify when a cell or sector within a cellular wireless communications network needs additional RF radio channel resources to maintain an acceptable quality of service, and which can further identify where idle RF radio channel resources exist and then direct the transfer those resources in batch form to the cell or sector in need.

SUMMARY OF THE INVENTION

It is a principal object of the present invention to provide a radio resource capacity management system and method for reallocating idle RF radio channel resources from a low traffic cell or cells (donor cell) within a local cellular wireless communications network to that of a cell or cells within the network which requires additional radio channel resource capacity over and beyond that which is dedicated to that cell (target cell). The radio resource capacity management system of the present invention is integrated into a local cellular wireless communications network that is comprised of a plurality of macro and DAS sites and a base station controller that is communicatively connected to each of the macro and DAS sites through respective backhaul transmission means that are comprised of fiber optic cable, coaxial cable, or microwave point-to-point links. Each of the macro and DAS sites within the network has a respective base transceiver station that respectively contains a plurality of RF radio channel resources that may be available for reallocation to neighboring macro and DAS sites within said local network or to cellular wireless communications networks outside the local cellular network.

To achieve this principal objective, a radio resource capacity management system is provided which is integrated into the local cellular wireless communication network by communicatively connecting a bi-directional link between the base station controller of the network and the radio resource capacity management system. The bi-directional data link provides continuous radio channel resource capacity data to the radio resource capacity management system, whereby said radio resource capacity management system is adapted to perform an internal optimization analysis of the radio channel resource capacity data received from the base station controller. The data that is continuously communicated from the base station controller to the radio capacity management system relates to quality of service data for each cell, and the quality of service of a particular cell directly relates to whether that cell requires additional radio channel resources in order to maintain an acceptable level of quality of service. Based on the radio capacity management system's review of that data, a cell that is identified as needing additional radio channel resources will be identified as a target cell, and likewise, a cell that has idle, available radio channel resources will be identified as a donor cell. Based on that internal analysis, the radio resource capacity management system will simultaneously determine the radio resource capacity requirements and the idle radio channel resources of each network site and then reallocate the idle RF radio channel resources to one or more macro and DAS sites within the network that requires additional resources. Alternatively, the radio resource capacity management system may be adapted to reallocate idle radio channel resources based upon an external directive, rather than internal directive, wherein the external directive is based on predetermined radio resource capacity requirements of each site that are communicated into the radio resource capacity management system through an internal network or internet connection with a remote monitoring and control system. All radio channel resources that are to be reallocated will physically pass through said radio resource capacity management system prior to arriving at their intended destination, or target site. The principal object of the invention is further satisfied by providing a respective RF transmission means that is dedicated to each of said macro and DAS sites for connecting said radio resource capacity management system to each of said macro and DAS sites, whereby said RF transmissions means facilitates the physical transfer of radio channel resources into and out of said radio resource capacity management system as said radio resources are reallocated within said network.

To also accomplish this principal objective, the radio resource capacity management system is to further comprise a respective slave capacity management system and independent backhaul transport means dedicated to each macro and DAS site. One end of each independent backhaul transport means will be connected to said radio resource capacity management system, while the other end will be connected to a respective slave capacity management system. The radio resource capacity management system is also to include a central radio resource controller, a central radio resource switch matrix and at least one conditioner. The central radio resource controller is connected to said base station controller via said bi-directional data link and is connected to each respective slave capacity management systems via a respective control link. The central radio resource controller is connected to said central radio resource switch matrix through a control circuitry and wherein the central radio resource switch matrix is connected to said at least one conditioner through a respective and identical transport connection.

Another object of the invention is to further provide the radio resource capacity management system with a centralized base transceiver station that contains a reservoir of radio channel resources that are available for reallocation. The centralized radio channel resources maximizes the overall system efficiencies by eliminating expensive, redundant radio channel resources from each cell within the network.

Another object of the invention is to provide the radio resource capacity management system with a GPS time delay system that accounts for the time delays that a reallocated resource will encounter during the process of routing and passing those resources through a variety of network equipment and backhaul transport means in between the donor site and the target site. To prevent the reallocated resources from being treated as signal interference by the target site's base transceiver station, the reallocated radio channel resources have to be in synchronicity with the radio channel resources of the target site, regardless of whether the resources are reallocated from a centralized base transceiver station or from one that is located at the macro or DAS donor site. The GPS timing system, in cooperation with the central resource controller or the slave capacity management controllers, computes those timing delays. The radio resource capacity management system then incorporates a timing delay methodology that utilizes the time delay information as a means of ensuring that all resources are matched or synchronized as a synergistic compilation of resources rather than as a compilation of resources that interfere with each other. The GPS time delay system is comprised of at least one GPS timing source unit and at least one programmable two-way radio transceiver system.

A final object of the invention is to provide a radio resource capacity management system and method for reallocating RF radio channel resources from a centralized reservoir of radio channel resources when the cellular wireless communications network is only comprised of active and/or passive DAS sites. The present invention accomplishes this objective by the provision of a radio resource capacity management system that includes a centralized base transceiver station which contains a reservoir of radio channel resources that are available for reallocation between the various DAS sites within the network which are in need of additional radio channel resources. Because this objective pertains to a network comprised of only DAS sites, the radio resource capacity management system does not require the slave capacity management systems and the respective independent backhaul transmissions means. Furthermore, if the network contains an active DAS site, the master radio resource capacity management system will further include a GPS time delay system that transmits the time delay information over the air rather than directly communicated through the network backhaul.

The features and advantages of the present invention will be further understood upon consideration of the following detailed description of an embodiment of the invention taken in conjunction with the drawings, in which:

BRIEF DESCRIPTION OF THE DRAWINGS

FIG. 1A is a prior art diagrammatic representation of a typical wireless cellular communications network;

FIG. 1B is a diagrammatic representation of the present invention interfaced into the wireless cellular communications network of FIG. 1;

FIG. 5 is a block diagram of the central radio resource controller, central radio resource switch, and signal conditioner that are part of the radio resource capacity management system shown in FIG. 4a;

DETAILED DESCRIPTION OF THE PREFERRED EMBODIMENT

Figure 2A:
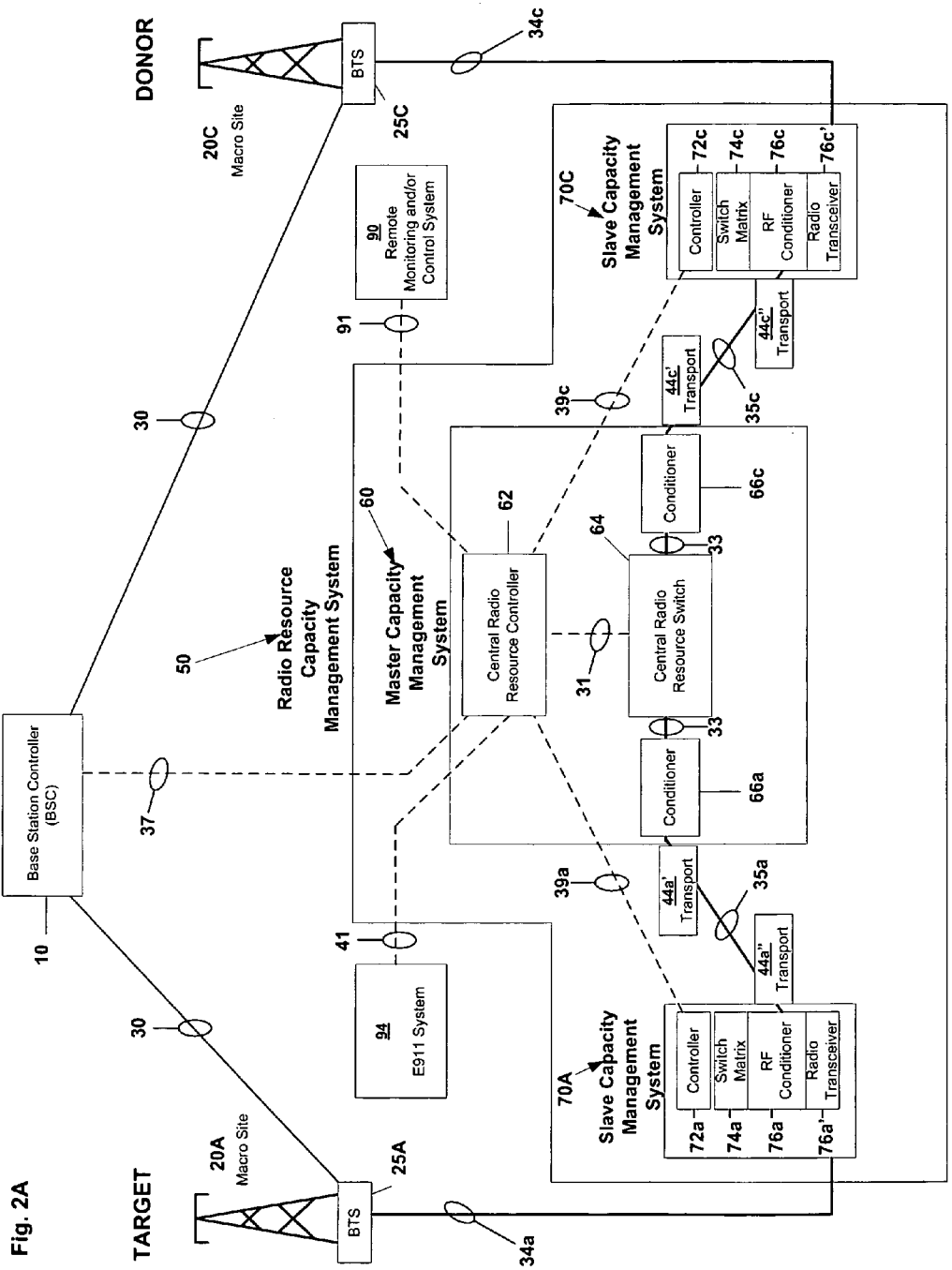
FIG. 2A is a diagrammatic representation of a first embodiment of the radio resource capacity management system of the present invention shown in greater detail and interfaced into the cellular communications network of FIG. 1.

A preferred embodiment of the present invention is designed to operate in the context of one or more wireless cellular communication systems that provide service to various types of digital wireless devices. Also, even though this detailed description may not specifically state so, all of the connections between the components which comprise the present invention, as well as those between the present invention and the existing prior art wireless communication network, will be bi-directional connections or bi-directional data links. The wireless cellular communications system of the present invention is also designed to interface with an existing, localized prior art wireless cellular communication system such as the one shown in FIG. 1A. In a typical prior art wireless cellular communication system, a localized geographical service area will be divided into a network of remote cells 20, where each cell represents an individual coverage area. This localized coverage area is shown in the drawing figure to be divided into five cells, 20A-20E, although it is to be understood that the number of cells is not so limited and could include an Nth cell, where N=1, 2, 3, 4, 5, ... N. As seen in FIG. 1A, cells 20A-20C, represent macro cell sites, which were described earlier herein, while cell sites 20D and 20E respectively represent passive and active DAS sites. A passive DAS site is a site that will receive reallocated RF radio channel resources without the need for signal re-amplification, while an active DAS site will require signal re-amplification. Each cell site, whether a macro or DAS site cell is typically further subdivided into smaller service areas known as sectors, with each sector having its own dedicated RF radio channel resource capacity. Each cell is typically subdivided into three or more sectors, although a cell can have a single sector or any number of sectors. The local wireless cellular communication network is further comprised of a plurality of remote individual base transceiver stations (hereinafter BTS) 25a-25e that represent one or more bi-directional radio transceivers which provide the radio frequency (RF) carrier channels for supporting mobile user wireless communications traffic within each cell of the localized geographical service area. The base transceiver stations that are utilized by the service providers are manufactured by outside original equipment manufactures' such as Lucent, Motorola, Siemens, Samsung, Nokia, Ericsson, etc. FIG. 1A also shows the localized communication system to further comprise of a base station controller (BSC) 10 in communication with each of the base transceiver stations 25a-25e through respective backhaul transport means 30a-30e. The backhaul transport means in most instances is usually a fiber optic cable or a microwave point-to-point link. For instance, the backhaul transport means connection between the BTS 25c and the BSC 10 could be fiber optic cable because of the BTS 25c is in close proximity to BSC 10, while the backhaul transport means connection between the BTS 25a and the BSC 10 could be a microwave point-to-point link because of the physical distance between the components. The backhaul transport means could even be coaxial cable or some form of a digital transport means, such as LAN or WAN, or a mixture of any of the above-mentioned means. No matter what type of backhaul transport means is employed, there will be a transport interface, know as a point of interface (hereinafter POI), located at each physical end of the transport means itself. Although the transport POI is not shown in FIG. 1A, and those in the art are well aware of the requirement that each end of the transport means will include a respective POI. The POI that is incorporated at each end of the transport means serves the function of acting as a means of physically connecting the physical transport means 30 to the various equipment components within the system. It is also known that a backhaul transport interface 44 will also be incorporated at each end of the backhaul transport means 30. The backhaul transport interface 44 functionally ensures that the signal format leaving the BSC 10 and communicated through the backhaul transport means 30 will be matched to that at the BTS end. For example, if the signal leaving the BSC 10 is in a fiber optic format, then the signal at the BTS end must be converted from the fiber optic format to the format that is usable at the cell site, which is usually RF. In FIG. 1A, the backhaul transport means 30a and 30e are seen to include respective backhaul transport interfaces 44a', 44a", and 44e', 44e". The respective backhaul transport interfaces are not shown for clarity's sake with respect to the sites 20B, 20C and 20D, although it should be understood that a backhaul transport interface will always be included and made a part of each end of the backhaul transport means, whether shown in any of the drawing figures or not. The BSC 10 continuously monitors the RF traffic within cellular network 20 in addition to coordinating the performance of various types of functions on the RF traffic such as coordination of call setup and cell handoffs to name a few. Reports are generated by the BSC for analysis by carrier RF engineers to ensure QoS metrics are being met. The present invention will utilize a select portion of that information with the methodology of capacity reallocation that is being taught by the invention. However it is important to understand that the present invention does not interfere or take over any functionality of the BSC, but present invention will issue commands for the BSC to execute. It is also important to understand that FIG. 1A is exemplary of a localized wireless cellular communications system but that a communications system for a given, but larger geographical area would actually be comprised of several, intercommunicating, localized communications systems that are all identically comprised of the elements described in FIG. 1A. Furthermore, when dealing with the cellular wireless communications system of the larger geographical area, it is common for the base station controllers of each localized cellular wireless system to be in communication with each other. The communication between each localized BSC is necessary in order to perform various inter-system functions such as base station controller-to-base station controller handoffs, trunk re-assignments, etc. The important point to emphasize is that there are a number of identical wireless cellular communications systems all communicating with each other in any larger geographical area. Each service provider determines the size of his geographical service area and/or areas. This larger geographical service area is typically known as a radio access network or RAN.

The prior art communications system shown in FIG. 1A is similar to the configuration that was taught in the Schwartz patent, except that Schwartz physically relocated each of the base transceiver stations from the macro sites, into a lone centralized base transceiver station. Moreover, instead of utilizing the BSC from one of the industries' usual manufactures such as Lucent Technologies, Schwartz substituted its' own base station controller, which used specially-designed algorithms to control and manage the RF resources.

Turning to FIG. 1B, the present invention herein identified at 50, is a radio resource capacity management system (hereinafter RRCMS), which is shown interfacing with the localized wireless communication system that was presented in FIG. 1A. In a preferred embodiment of the invention, the RRCMS 50 locates available, idle RF radio channel traffic resource capacity that exists within any one of the networked cells 20A-20E, conditions the power and/or format of the RF radio channel traffic resources, and then redistributes those resources directly to other remote macro sites within the cell network 20 that are in temporary need of additional RF radio channel resources. The reallocated resources are transferred through respective RF transmission means 34a-34e that are connected to each of the base transceiver stations 25a-25e. The RF transmission means may consist of coaxial cable or a fiber optic cable, depending upon whether the individual base transceiver stations 25a-25e are configured to function with either fiber optic or coaxial cable, as will become clearer later herein. The RRCMS 50 does not physically or functionally replace the existing BSC 10, but does direct the BSC 10 to complete the reallocation of the RF radio resources, as determined by the RRCMS 50. In a wireless cellular network, it is typical to have radio resources sitting idle at various remote macro sites at various times throughout the day. The RRCMS 50, being communicatively connected to the BSC 10, is adapted to determine in which cell or cells the idle resources are located and also determine which cell or cells are in need of additional capacity. Based on those determinations, RRCMS 50 sends command directives to the BSC 10 to divert the idle resources to the site where capacity is needed. As seen in the figure, the RRCMS 50 is communicatively connected to BSC 10 via a bi-directional data link 37 that supports the sharing of information from BSC 10 to the RRCMS 50, as well as passing command instructions from RRCMS 50 to the BSC 10.

With the RRCMS of the invention, the base transceiver stations (25a-25e) RF capacity of each individual transceiver radio can be interchangeably switched and reallocated between each of the cells 20A-20E, to one of the cells, or to a combination thereof. With the methodology of the present invention in conjunction with the RRCMS 50, a means of physically increasing the capacity of a particular cell (target cell) can be readily satisfied if that target cell's radio transceiver malfunctions or if that target cell's capacity cannot support the changing traffic demands placed upon it during any particular time period of the day. Furthermore, it is also anticipated that the method of the present invention could also reallocate the BTS capacity of each cell to either a passive or active distributive antenna system, which are respectfully shown in FIG. 1B as elements 20D and 20E, as will be explained in greater detail later herein. Moreover, it is also anticipated that the method of the present invention could also reallocate resources from a centralized BTS that is incorporated into the RRCMS 50 to any of the macro or DAS sites within the cellular wireless communications network. Finally, It is also anticipated that the method of the present invention could also reallocate the BTS RF radio channel traffic capacity from one localized cellular wireless communications network with another localized wireless cellular communications network, and even with other wireless cellular communications systems outside of the RAN.

Figure 2B:
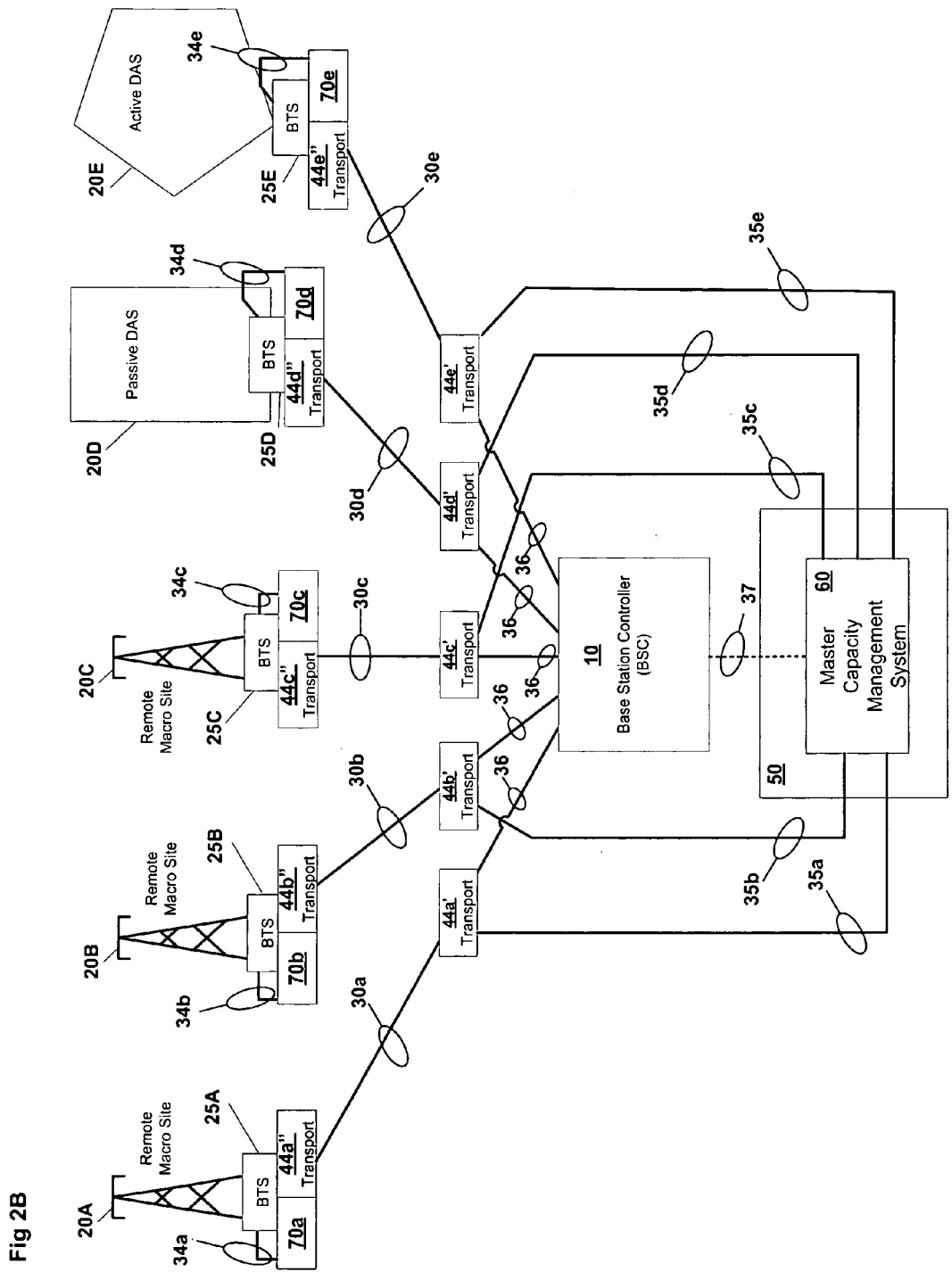
FIG. 2B is a diagrammatic representation of a second aspect of the first embodiment of the invention where the interfacing of the radio resource capacity management system of the invention is through the backhaul transport means of the wireless cellular communications network.

In a second aspect of the first embodiment of the invention, shown in FIG. 2B, the physical reallocation of the radio channel resources in accordance with the invention is accomplished by utilizing the existing prior art backhaul transport means 30*a*-30*e* which are present in all wireless cellular communications systems, instead of providing an additional, independent backhaul transmission infrastructure. As was explained in reference to FIG. 1A, the backhaul transport means 30*a*-30*e* is employed to communicatively connect the BSC 10 to the base transceiver stations 25*a*-25*e* as a means to support control commands between the BSC 10 and each remote base transceiver station 25*a*-25*e*. The backhaul transport means is also employed to simultaneously carry user voice and data traffic. As FIG. 2B shows, when the existing backhaul transport means 30 is used, then the RRCMS 50 must be first interfaced with the existing backhaul transport interfaces 44*a*'-44*e*' by interconnection with the respective independent backhaul transport means 35*a*-35*e*. From the backhaul transport interfaces 44*a*'-44*e*', the reallocated radio channel resources are directed to the respective second backhaul transport interfaces 44*a*"-44*e*", which are typically physically located within the respective base transceiver stations 25*a*-25*e*, although FIG. 2B shows the second backhaul transport interfaces outside the base transceiver stations for the sake of clarity. From the second backhaul transport interfaces 44*a*"-44*e*", the reallocated radio channel resources are then directed into a respective slave capacity management system 70*a*-70*e*, a component of the RRCMS 50, which will be described in greater detail later herein. Ideally, the slave capacity management systems 70*a*-70*e* will also be physically located within each of the respective base transceiver stations 25*a*-25*e*, and they are connected to the second backhaul transport interfaces 44*a*"-44*e*". Once within the respective slave capacity management systems 70*a*-70*e*, the reallocated resources will be first directed into the respective RF transmission means 34*a*-34*e* and then into other equipment within the respective BTS 25*a*-25*e*, prior to being distributed to the antennas of each site. That arrangement is in contrast to the FIG. 2A arrangement, where the RRCMS 50 was connected directly to a respective RF transmission means 34*a*-34*e*. In either case, in order for the present invention to function, it is a requirement that the RRCMS 50 is ultimately communicatively coupled to each BTS 25*a*-25*e* within the localized service area, or RAN, or even to a BTS that may be outside the RAN in order to reallocate radio channel resources to a cell or cells that need additional radio resources channel capacity, whether the cell or cells is comprised of a macro site or a distributed antenna system (DAS) site.

Turning attention to FIG. 2A, the RRCMS 50 of the present invention is shown in detail to be comprised of a Master Capacity Management System (MCMS) 60 and Slave Capacity Management Systems 70 (SCMS) and respective independent backhaul transport means 35*a*-35*e* that communicatively connect each SCMS 70 to the MCMS 60. For the sake of clarifying the invention, it is important to understand that the SMCS 70 is actually comprised of a plurality of individual slave capacity management systems, each of which would be located at each macro or DAS cell site within the network of cells 20. In the example that will be described in conjunction with FIG. 2A, only slave capacity management systems 70*a* and 70*c* are shown. With a macro site, such as sites 20A-20C, and with a passive DAS site, such as site 20D, each of which was shown in FIG. 1B, the SCMS 70 would be typically physically located within or in very close proximity to the base transceiver station 25 that is associated with a particular cell site, although it is not absolutely necessary that the SCMS 70 be located therein. With an active DAS site, such as site 20E, the SCMS 70 does not necessarily have to be located at or in close proximity to the respective active DAS site. Thus, it should be appreciated that with the wireless cellular network that was presented in FIG. 1B, there would be respective slave capacity management systems 70*a*-70*e* associated with each of the base transceiver stations 25*a*-25*e*, although they were not shown in that figure. In the drawing FIG. 2A, since only two cell sites are being discussed and described, only two slave capacity management systems 70*a* and 70*c*, are shown.

The MCMS of the invention is seen to further comprise a central radio resource switch controller 62 (hereinafter CRRC) that is connected through control circuitry 31 to a central radio resource switch 64 (hereinafter CRRS) that is comprised of a bank or matrix of individual RF switches. The CRRC 62 is also connected to each respective SCMS 70*a*-70*e* through the control links 39*a*-39*e*, although in FIG. 2A, only control links 39*a* and 39*c* are shown since only SMCS 70*a* and SMCS 70*c* are being shown and described. The function of the control links is to send the switching configuration changes to be activated in each respective SCMS 70*a*-70*e*, in order to accomplish system wide resource allocation in accordance with the invention. In addition, the CRRC 62 is also connected to the BTS 10 via the data link 37 and could be further connected to third party equipment such as E911 emergency systems 94 via data link 41. The E911 emergency system 94 is of the type commonly used by the wireless cellular carriers in the United States. The RRCMS 50 would be connected to the E911 emergency systems through CRRC 62 in order to avoid catastrophes that may result when RF traffic resources are reallocated to another cell. For example, if an emergency call originates in cell 25*e* but the resources of that cell have been routed to cell 25*a*, the emergency call could be routed to the wrong emergency call dispatch center. The CRRS 64 is seen to be connected to the bi-directional conditioners 66*a* and 66*c* via a respective transport connection 33, which acts as a hardwire connection between the CRRS 64 and the respective conditioners. It is also envisioned that this connection could be made through the use of a printed circuited board (not shown). The conditioners 66*a* and 66*c* comprise a series of components that condition the RF radio resources that are to be reallocated. Depending upon the circuitry and the various components that comprise the wireless cellular communications system, the conditioners could comprise combiners, couplers, splitters, circulators, duplexers, isolators, filters, attenuators, amplifiers, etc. In the arrangement presented by FIG. 2A, it is to be understood that one conditioner is disposed on an input side of the CRRS 64 and the other is disposed on an output side of the CRRS 64. The use of the term input and output will depend upon which direction the RF capacity will be reallocated through the RRCMS 50, and hence, through the CRRS 64. For example, with the macro site 20C being the donor site or the site whose capacity will be reallocated, the conditioner 66*c* that lies in between CRRS 64 and BTS 25*c*, would be considered the input conditioner. Likewise, the conditioner 66*a* that lies between CRRS 64 and BTS 25*a* would be considered the output conditioner. Of course, if the target and donor sites were interchanged, then the label of which conditioner behaves as the input and output conditioner would also be interchanged. Likewise, in FIG. 2A, it is also to be understood that there will be one conditioner dedicated for each macro or DAS site in the wireless cellular communications systems even though only two conditioners are shown, 66*a* and 66*c*. Thus, the MCMS 60 would actually be comprised of five conditioners (66*a*-66*e*) connected to the CRRS 64, assuming that there are five macro and/or DAS sites, 20A-20E. Furthermore, it will become clearer through the explanation later herein, that in some situations, a respective conditioner might not even be required, depending upon whether the CRRS 64 and the respective independent backhaul transport means 35a-35e are of a matched or compatible operating format. In addition, it is also possible that each respective conditioner could comprise a multiplicity of components that are placed in various locations within the MCMS 60 depending upon the pathway and direction flow of the reallocation of the resources. This point will become clear in the later description related to FIGS. 3B and 6B. As part of the invention, each conditioner 66a and 66c are respectively connected to SCMS 70a and 70c via a respective independent backhaul transport means 35a and 35c. The independent backhaul transport means may be fiber optic cable, microwave point-to-point link, coax cable or some form of a digital transport means, such as LAN or WAN, or a mixture of any of the above-mentioned means. It is not a requirement that the independent transport means 35a and 35c be matched in type, which means that backhaul transport means 35a could be fiber optic while the backhaul transport means 35c could be microwave. When the CRRC 62 recognizes that a particular cell's traffic loads have been exceeded, the controller will automatically search the cell network 20 for a cell that has available resource capacity for reallocation. The CRRC 62 is preprogrammed to automatically initiate the reallocation or the CRRC 62 can be manually directed to reallocate available capacity via the remote monitoring/control system 90 via an internal network or internet connection 91. The remote monitoring/control system 90 could be a separate mainframe, desktop, laptop provided by the carrier or any third party system, etc. One of the important functions of the CRRC 62 is to monitor statistical trending data that is generated within the BSC 10 regarding the traffic loads within each of the individual base transceiver stations 25 that are connected to BSC 10, with respect to how those loads affect QoS within each cell. The trended data that is gathered by the BSC 10 is compiled into data files which are generated on a predetermined time basis, usually every hour. The hourly generated data files are gathered by CRRC 62 via the data link 37, whenever a new file is detected. Based on this gathered data, the CRRC 62 compares pre-programmed and desired QoS threshold levels that are stored within the CRRC 62 with the current, gathered QoS data received from the BSC 10 as that data relates to resource capacity. Based on the comparative values, the CRRC 62 will then determine if a cell is in need of additional capacity and which cell would be the best cell to treat as the donor cell from which the resources should be taken. The CRRC 62 is programmed to solicit the BSC 10 and to direct it to consolidate traffic resources within that donor's BTS. For example, if the donor BTS has four available radios and one of them is being lightly used, the BSC 10 will be solicited by the CRRC 62 to direct the donor BTS to block any further traffic into that radio, and then further direct the BTS to move any existing traffic from that radio to one of the other three radios in that donor BTS. These intermediate steps will ensure that at least one of the radio resources is entirely idle and available for reallocation. The CRRC 62 then queries the BSC 10 for additional information to verify if the resource is idle. Once the CRRC 62 confirms that resource is idle, it is further programmed to request that the BSC 10 makes the appropriate system data changes to accommodate the move from the donor BTS to the target BTS. The BSC 10 must communicate the requested changes with the donor BTS, target BTS, and the target's neighboring base transceiver stations. There is a variety of necessary data changes that the BSC 10 must complete to ensure that the reallocated capacity does not act as an interferer in the target cell or the target cell's neighboring cells. The system data changes that must be communicated to those various base transceiver stations are radio resource timing offsets, RF transmission delays, neighbor lists, radio-specific spreading codes, such as Walsh and Symbol codes, etc. At the same time, the CRRC 62 also updates the E911 94 with all necessary system configurations and data files that are needed for it to properly function so that the E911 system does not route emergency calls to an incorrect call dispatch center. Only after these system data changes are executed by the BSC 10 and E911 system 94, can the radio resources be moved by the RRCMS 50. After all updates and/or system configurations are confirmed by the CRRC 62, then and only then will the CRRC 62 route the RF resources as desired through activation of the CRRS 64.

Assuming all updates and systems configurations have been confirmed by the CRRC 62, the identified traffic resources that will be reallocated from a donor site must first be physically connected through that site's SCMS 70 to the MCMS 60. In this example, the resources BTS 25c will eventually be routed to SCMS 70c through the RF transmission means 34c. The RF transmission means 34c will actually be comprised of one or more transmission cables, the number of cables depending on the number sectors or antenna configurations within the macro or DAS site. In greater percentage of the wireless cellular systems, the transmission cables will be coaxial cable, although in some systems, it could be fiber optic cable. To accomplish this connection, the CRRC 62 will signal the appropriate SMCS, in this case, SCMS 70c, through control link 39c to activate the Slave Radio Resource Controller 72c (herein after SRRC 72c). The SRRC 72c in turn, commands the Slave Radio Resource Switch 74c (herein after SRRS 74c) to physically arrange itself such that the donor's radio resources from BTS 25c are now connected to the backhaul transport means 35c through the RF transmission means 34c, which will either be comprised of a coaxial or fiber optic cable.

In addition, the CRRC 62 simultaneously signals the intended target SMCS 70, in this case, 70a, through 39a to activate the slave radio resource controller 72a (herein SRRC 72a). The SRRC 72a in turn, commands the Slave Radio Resource Switch 74a (herein after SRRS 74a) to physically arrange itself such that the donor's radio resources from BTS 25a can be received by the target's BTS 25a, via the RF transmission means 34a, which will either be comprised of a coaxial or fiber optic cable, and may be comprised of more than one cable.

It should also be understood that the SCMS 70c usually performs other signal conditioning of the reallocated resources prior to routing the resources to the independent backhaul transport means 35c, such as attenuating, combining, splitting, duplexing, amplification, and any combination thereof. The type of signal conditioning will depend upon whether the resources are being added to or taken from the base transceiver station 25 and the type of independent backhaul transport means 35 that is physically provided between the slave capacity management system 70 and the master capacity management system 60. Assuming that the resources have been conditioned, the resources are then routed to the independent backhaul transport interface 44c'' prior to being routed into the independent backhaul transport means 35c. The independent backhaul transport means 35c is comprised of equipment known to those in the art that will convert the reallocated signal which arrives at transport interface 44c'' into a signal that will match the format of the independent backhaul transport means 35c. Thus, if it is assumed that the independent backhaul transport means 35a is a fiber optic cable, and the signal at the backhaul transport interface is an RF format, then the equipment comprising a part of the transport means will convert the RF signal format into an acceptable light signal formant for communication along the fiber optic cable. At the opposite end of the fiber optic cable, there will be a second piece of equipment associated with the independent backhaul transport means 35c that will convert the routed signal to that required at the transport interface 44c'. From the transport interface 44c', the reallocated signal is directed into the conditioner 76c that is disposed within the SCMS 70c.

Thus, if the independent backhaul transport means 35c is a fiber optic cable and the signal at the backhaul transport interface 44c" is an RF signal, the backhaul transport means 35c will convert the RF signal into an acceptable light formant signal for communication along the fiber optic cable of the independent backhaul transport means 35c. At the opposite end of the fiber optic cable there will be a second backhaul transport interface 44c' and the reallocated signal at that point will be received within the conditioner 66c that is disposed within the MCMS 60. In this particular example, since the resources are coming from the donor side macro site 25c, the conditioner 66c would actually be considered the input conditioner, as previously described above. Prior to the resource signal being further routed to the CRRS 64, the conditioner 66c may perform additional signal conditioning that depends upon whether the backhaul transport means' format is matched to that of the CRRS 64. For example, if the switch is an RF switch and the independent backhaul transport means 35c is fiber optic, then the light signal has to be converted to an RF signal. If the CRRS 64 is fiber optic based, and the backhaul transport means is fiber optic cable, then, then no signal conditioning would be required. Likewise, if the CRRS 64 is RF based, and the backhaul transport means is coaxial cable, then no signal conditioning would be required either. Thus, when the backhaul transport means is not matched to the type of switch being employed, then some form of signal conditioning would be performed to match the signal formats. Furthermore, other forms of conditioning might also be required, such as signal re-amplification to account for signal power losses. After the conditioning is performed, if needed, the resources are routed into the CRRS 64 via transport connection 33 which is within MCMS 60. Another transport connection 33 is disposed between the CRRS 64 and the second conditioner 66, in this case the output conditioner 66a. The resources that are routed via the transport connection 33 into the output conditioner 66a may or may not require additional signal conditioning before the resources routed to transport interface 44a'. Conditioning will depend upon the type of independent backhaul transport means 35a that will be receiving the resource signal once it exits the MCMS 60 as the resources are being directed towards the target site 20A. The signal conditioning that is anticipated within output conditioner 66a would be similar to the type of conditioning that was explained earlier when describing the conditioning that occurs between the SCMS 70c and the MCMS 60. Furthermore, a format conversion must take place within the conversion equipment that comprises a part of the independent backhaul transport means 35a. This conversion equipment is of the same type that was described in association with the backhaul transport means 35. The signal leaving the output conditioner 66a will arrive at transport interface 44a'. At that point, the reallocated resource is then converted to a backhaul format which is compatible to the format required of the backhaul transport means 35a. The independent backhaul transport means 35a is comprised of equipment known to those in the art that will convert the reallocated signal which arrives at transport interface 44a', to match the signal format of the independent backhaul transport means 35a. Thus, if it is assumed that the independent backhaul transport means 35a is a fiber optic cable and the signal at the backhaul transport interface is an RF signal, then the equipment that comprises a part of the backhaul transport means, will convert the RF signal into an acceptable light format for communication along the fiber optic cable. At the opposite end of the fiber optic cable, there will be a second backhaul transport interface 44a". Once the routed signal is received at that interface, the backhaul equipment will reconvert the light format to an RF format prior to being received within the conditioner 76a that is disposed within the SCMS 70A. The routed RF signal is then directed into radio transceiver 76a', which is a part of the SCMS 70A. Instead of a radio transceiver, a bi-directional amplifier (BDA) could be used in its place since both components have a similar function. Under almost all circumstances, the radio transceiver 76a' will be required to amplify the reallocated resource to match the transmit power of the RF transceiver(s) within BTS 25a because the signal strength, or power of the signal will be so low that there will be no practical way for the routed signal to be radiated from typical DAS or macro site antenna systems. Once the routed signal is re-amplified it is then directed through the SRRS 74a and into the sector RF transmission means 34a. From that point the reallocated resources are directed into BTS 25a prior to the resources being ultimately routed to the desired sector within cell 20A.

Figure 3A:
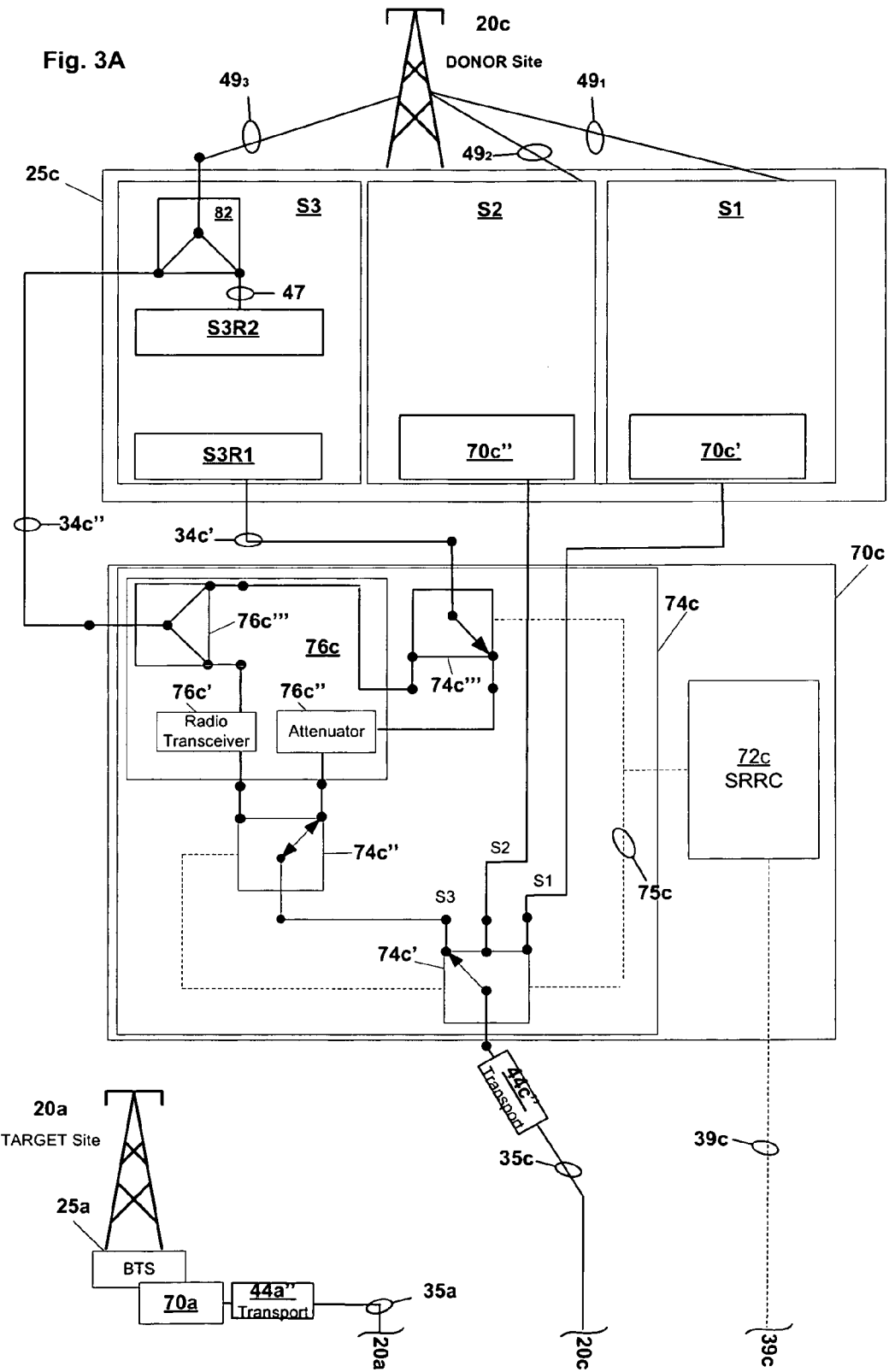
FIG. 3A is a diagrammatic representation emphasizing the routing of reallocated RF radio channel resources through the various elements of the slave capacity management system, a component of the present invention that is dedicated to the donor macro cell site.
Figure 3B:
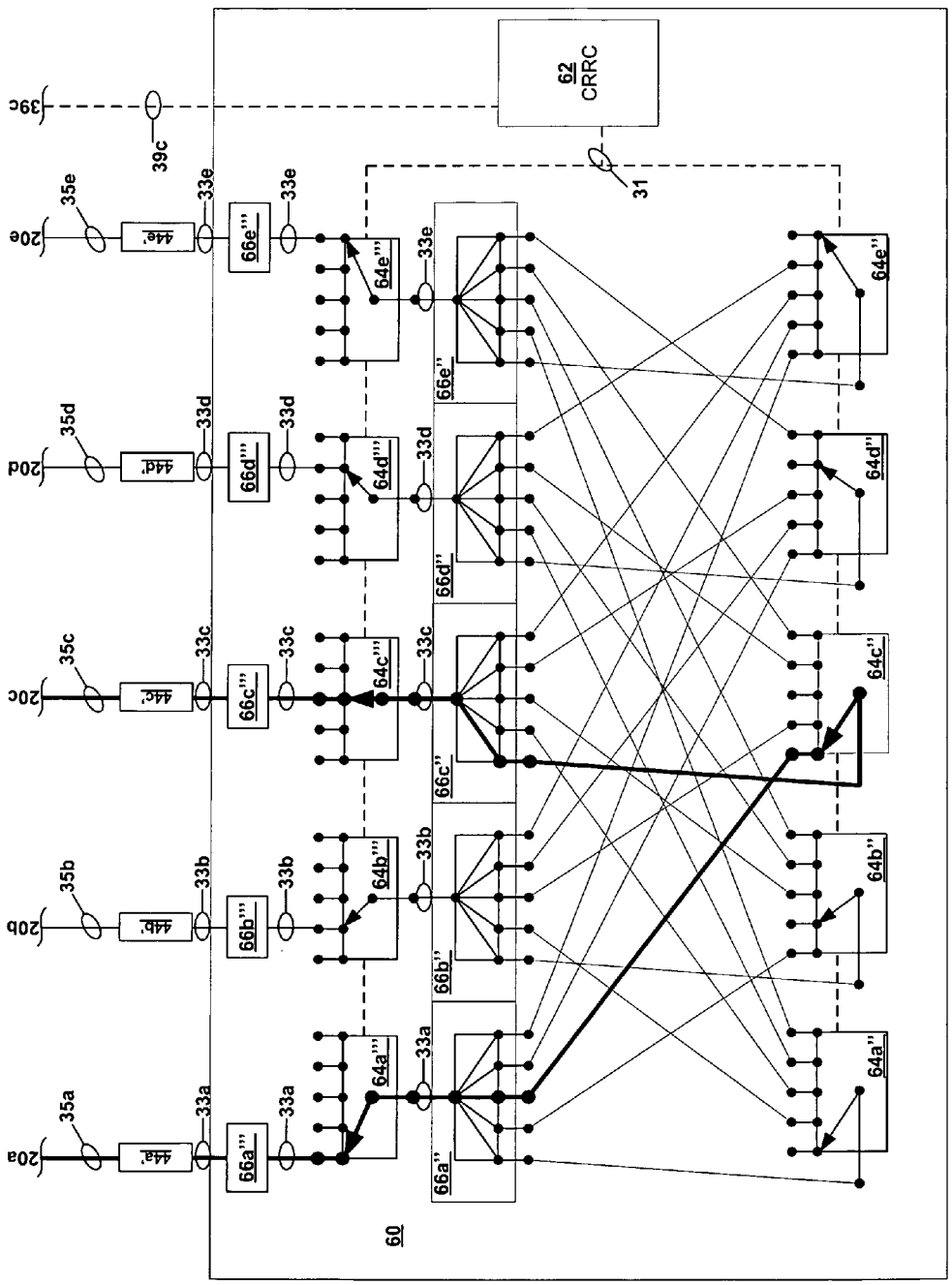
FIG. 3B is a diagrammatic representation emphasizing the routing of reallocated RF radio channel resources through the master capacity management system, a component of the radio resource capacity management system of the present invention.

In FIGS. 3A and 3B, detailed diagrammatic representations are provided to emphasize the interaction of the various components of the RRCMS 50 of the invention when radio resources from a donor macro site (20C) are reallocated to the target macro site (20A). In the example presented through FIGS. 3A and 3B several presumptions are being made in order to simplify the explanation of the interaction. First, it will be presumed that macro site 25a requires additional radio resource capacity and that macro site 25c has been identified by the CRRC 62 as having available redundant radio resource traffic capacity (R1) within its third sector (S3), which will be reallocated. Second, it has already been determined that macro site 20C requires a minimum of at least one radio resource that is always dedicated to sector S3 to meet its basic service needs, although in reality, each sector within a macro site, may not necessarily require its own dedicated radio resource. Third, it is also presumed that the CRRC 62, has already confirmed that the system configuration updates have been executed by the BSC 10, which must be verified prior to committing to a reallocation of the identified donor resources. Fourth, it is also presumed that the radio resources from any particular sector of any given network of macro or DAS sites (20A-20E), whether they are considered to be dedicated resources or potential donor resources, will be communicatively connected to that macro site's slave capacity management system, in this case 70c. In the example that is being presented through FIG. 3A, radio S3R1, which is located in sector S3 of macro site 20C, is directly connected by transmission means 34c' to the SCMS 70c, while radio S3R2 is directly connected to combiner 82 of the BTS 25c through leg 47 and would be considered to be indirectly connected to the SCMS 70c through transmission means 34c". In this particular example, the radio S3R1, being identified as the donor resource, is connected to the SCMS 70c through the transmission means 34c', which is considered a "hard" connection to switch 74c''' of SRRS 74c, while transmission means 34c" is connected to the combiner 76c''' of the conditioner 76c and to the combiner 82 of the BTS 25c through respective hard connections. The radio S3R2, in this example, is considered to be the dedicated sector radio because it is connected to the combiner 82, which in turn, is connected directly to the antenna of macro site 20C, via the leg $49_3$ in order provide the basic cellular wireless service to that sector. The combiner 82 is also provided to add radio resource capacity to that sector, rather than to remove capacity from that sector. The added capacity may be provided by the non-dedicated radio S3R1 or additional resource capacity can be introduced from another networked radio resource or from a networked, centralized radio resource reservoir. Moreover, additional resource capacity may be added to sector S3 through combiner 82 if either or both of the radios R1 or R2 fail. The addition of networked, centralized radio resources will be explained later herein with reference to FIGS. 4A and 4B and FIGS. 6A and 6B. With the present invention, additional radio resources could even be provided to this sector from a macro or DAS site or a centralized radio resource reservoir that are outside of the localized cellular wireless communications system. Now that all the presumptions have been set forth, the resource reallocation process proceeds as follows. Initially, the CRRC 62 will command the SRRC 72c of SCMS 70c via the data link 39c, to configure the SRRS 74c such that the donor resources are readied for reallocation. To accomplish that end result, the SRRC 72c will sends a command through control circuit means 75c, directing the switches SRRS 74c', 74c'' and 74c''' to configure themselves so as to connect radio resource S3R1 of the third sector, to the appropriate RF transmission means 34c'. Simultaneously, as best seen in FIG. 3B, CRRC 62 will command the CRRS 64 to configure its switches 64a-e, specifically switches 64a'-64a''', and 64c''-64c''' in such a way that the radio resource S3R1 will be directed to the SCMS 70a, depicted in FIG. 3A. Specifically, the resources of radio S3R1 are first directed into transmission means 34c', which is connected to switch 74c''', where it is then directed attenuator 76c'' that is within the conditioner 76. The power level of the resources are reduced within attenuator 76c'' to match the power requirements of the equipment of the independent backhaul means 35c. From the attenuator 76c'', the resources enter switch 74c'', then to switch 74c', which is sector selector switch between the three sectors. From that switch, the resources enter the transport interface 44c'' prior to entry into the independent backhaul transport means 35c, which is connected to the transport interface 44c' at the opposite end of the backhaul transport means 35c. The backhaul transport means 35c then connects to the MCMS 60, which is shown in FIG. 3B. As this figure shows, the MCMS 60 is comprised of a series of conditioners 66 and switches 64. In this example, the input conditioner (66c) is actually comprised of two conditioners, the first being 66c''', which is connected to the transport interface 44c' via the transport connection 33c, and the second conditioner being 66c'''. All transport connections 33 into, out from, and within the MCMS 60 will typically consist of either a coaxial cable or fiber optic cable. The first conditioner 66c''' may further condition the reallocated resource by amplifying or attenuating the signal if the signal power requires some form of adjustment. The type of resource conditioning, either re-amplification or attenuation, will depend upon the complexity of switching, splitting and/or combining that is ultimately required to be performed within the MCMS 60 and prior to the resource being routed out of MCMS 60, prior to its final destination. In this specific example, the heavy, dark line is intentionally provided in order to facilitate the description of how the resources are being routed through the MCMS 60. With this example, it will also be assumed that conditioner 66c'' will not be performing amplification or attenuation, but will be performing signal conditioning in the form of splitting the signal. The two conditioners 66c''' and 66c'' are separated by the switch 64c''' that is connected to each conditioner via the transport connections 33c. The switch 64c''' is part of the switch matrix 64 that is disposed within the CRRS 64. The switch 64c''' is seen to have one of its throws dedicated to macro site 20C, which is shown in the figure to be the one that is selected. From the selected throw of switch 64c''', the resources are passed through second conditioner 66c'', which in this case consists solely of a splitter 66c''. The splitter 66c'' allows connectivity to each of the respective switches 64a''-64e'', which are also part of the switch matrix 64. The switch 64c'' has other throws (not specifically identified) that are capable of routing the resource signal to any of the other macro and DAS sites 20B-20E. From switch 64c'' the resources are further routed to the output conditioner 66a''. In this case, the output conditioner 66a (see FIG. 2A) is comprised of two conditioners, the first being the conditioner 66a'' and the second being conditioner 66a'''. In this example, the first conditioner 66a'' is comprised solely of a combiner that can combine the reallocated resources from each of the macro or DAS sites 20B-20E, if necessary. This example is only reallocating the resources from macro site 20C. From the combiner 66a'', the resources are connected to switch 64a''', which has a throw that is selected to route signal to macro site 20A. Prior to the resources ultimately being directed to the macro cell site 20A, switch 64a''' will be connected to a second conditioner 66a''' that also a part of the output conditioner where further amplification adjustments can be performed to account for losses incurred while passing through multiple components within the MCMS 60. From conditioner 66a''', the resources are routed via the independent backhaul transmission means 35a to the SCMS 70a that is associated with the BTS 25a of macro site 20A, as depicted in FIG. 3A. The further routing of the resources through the SCMS 70a and out to the antenna, was previously described in reference to the FIG. 2A drawing figure and will not be reiterated here because the previous description would support that the routing at this point would be exactly the same. With the resource reallocation example just explained, all of the components and their respective functions were considered from the sense of a transmit path. However, all of the components of the invention are functionally bi-directional. Therefore, the reverse of the signal routing path would be considered the receive path, which would follow the exact same circuit path as previously described, but only in reverse. In that case, the components comprising the conditioner 66 would still be the same components, but their functions would be reversed. For example, component 66c'' was considered a splitter with respect to the transmit path, but would be considered and function as a combiner on the receive path.

Figure 4A:
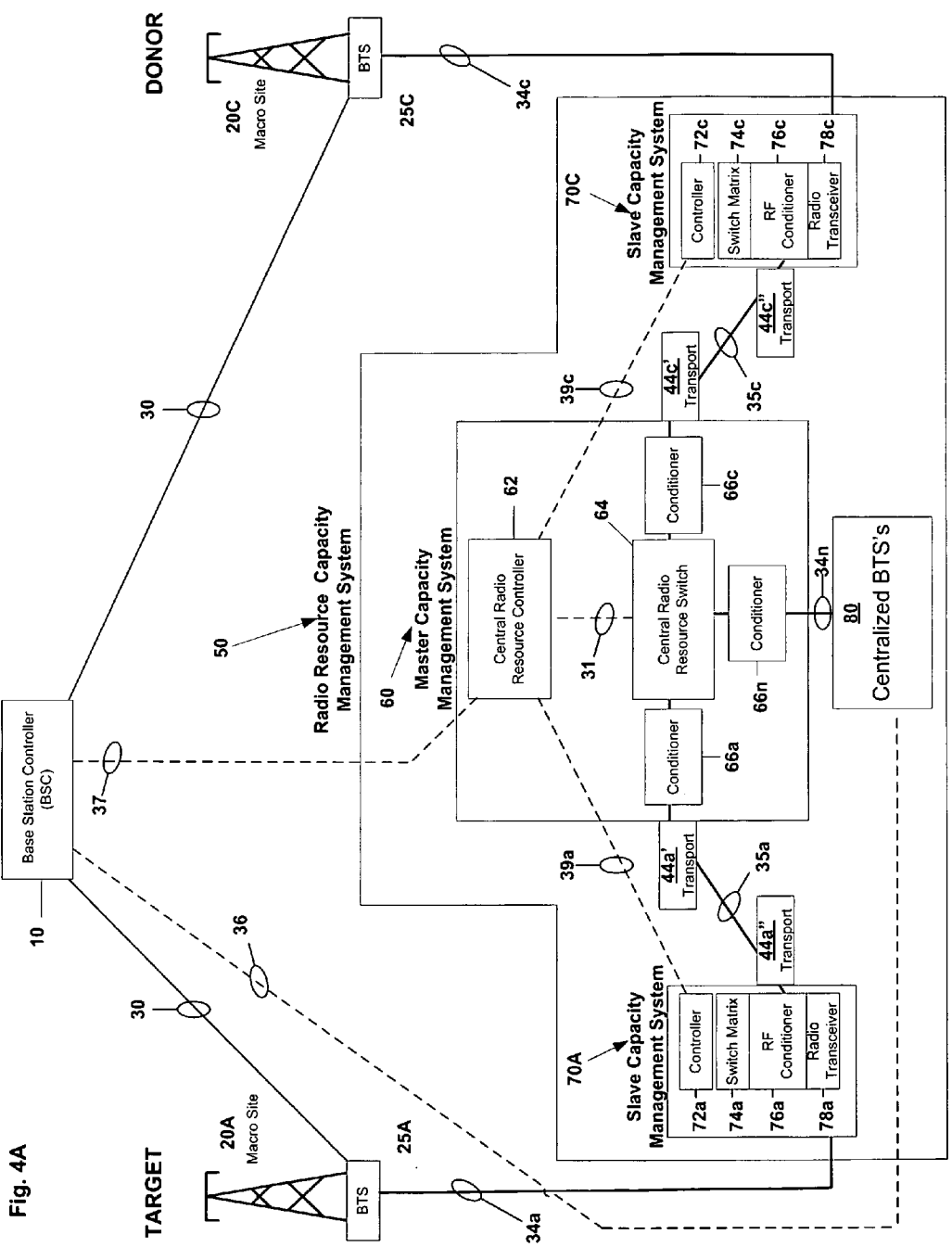
FIG. 4A is a diagrammatic representation of a second embodiment of the present invention whereby a centralized base transceiver station is incorporated as another component of the radio resource capacity management system.

Turning attention to FIG. 4A, a second embodiment of the invention will now be described. In this embodiment, a suggested arrangement of the network is provided wherein it is seen that a centralized base transceiver station 80 (CBTS) has been added to the RRCMS 50, as well as the central conditioner. Preferably the CBTS 80 could be located in the same physical location as the MCMS 60, although it could be located anywhere within the operating area of the BSC 10 that it is in communication with. For clarity's sake, even though all of the conditioners within the RRCMS 50 of this embodiment are identical, each of the conditioners has been respectively labeled as conditioner 66a, 66c, and 66n. In this example, because the resources will be reallocated from the donor macro site 20C to the target macro site 20A, the rightmost conditioner 66c will be considered the input conditioner, and the conditioner 66a would be considered the output conditioner. However, as mentioned earlier, the label "input" and "output" is arbitrary as it really depends upon the direction that resources are being reallocated. In this case the central conditioner is identified as 66n, and it is preferred that the centralized conditioner 66n be physically located as close to the CBTS 80 as possible. Otherwise, if the CBTS 80 and the conditioner 66*n* are physically separated by more than a relatively insubstantial amount, then a backhaul transport means would be used to communicatively connect those components together. If those components are relatively close to each other, then a coaxial cable connection with no backhaul transport means would communicatively connect those components together. It is also seen that the centralized BTS 80 is connected to the BSC 10 through data link 36. The centralized BTS 80 represents either redundant radio resource capacity that can be distributed throughout the wireless cellular system as needed or it can represent a truly centralized and single base transceiver station. By that it is meant that the localized base transceiver stations which are located at each macro or DAS site, as presented in FIG. 1A, have had the radio and supporting resources removed and those radio resources are now centrally located within a single base transceiver station. FIG. 4A shows that the macro sites 20A and 20C still have a respective base transceiver station, although the only equipment that would remain in such stations would be GPS equipment, the backhaul transport equipment, and air conditioning and/or heating equipment, etc. The addition of a CBTS 80 to the RRCMS 50 advantageously would significantly reduce operating costs due to the fact that the radio resource equipment is not dispersed in multiple locations. Drive time to and from non centralized locations to service the equipment and or to install additional BTS equipment would be saved, thereby reducing operating costs. Furthermore, system wide radio resource capacity management from a single location would be far more economical since some of the slave capacity management system functions are being performed within the master capacity management system as a result of the centralization of the radio resources. This means that fewer components within the SCMS are needed such as certain switches, combiners, circulators, isolators, filters, and attenuators, etc. In other words, certain circuitry and hardware that would have been required to connect the idle RF traffic resources from a donor macro site to a target macro site is eliminated because the excess capacity of the donor site is in effect, already located at the centralized location. This centralization eliminates the circuitry of the donor leg which is otherwise required to transfer the donor site's resource capacity back to the MCMS 60.

An example of how this simplified configuration works will now be explained, and it will be assumed for the sake of clarity that the CRRS 64 is of an RF format and the backhaul transport means 35*a* is comprised of a fiber optic and associated equipment. The RF resource of the CBTS 80 is first routed through transport means 34*n* which typically would be coaxial cable, and then sent through conditioner 66*n*. The conditioner 66*n* will reduce the RF power before reaching the CRRS 64 in order to facilitate downstream conditioning. The signal is then routed into the CRRS 64 where the resources are then switched towards the macro or DAS site that requires the additional capacity. Along those lines, the resources might require additional conditioning within either the input or output conditioners 66*c* and 66*a*, depending upon on which direction the resources will be sent. Whether or not additional conditioning is required and the extent of such conditioning will depend upon the type of independent backhaul transport means that is employed. For example, if the resources are being directed to macro site 20A, and the backhaul transport means 35*a* is a point-to-point microwave backhaul, the output conditioner 66*a* would have to possibly further attenuate the RF-based resource signal to meet that backhaul equipment's input RF power requirements. The conditioner 66*a* would not have to further condition the resource signal to match the backhaul transport means because as mentioned previously, the backhaul equipment will convert the format of the RF resource to match the format of backhaul transport means 35*a*.

From the conditioner 66*a*, the resource is sent through the backhaul transport means 35*a* which is then re-converted to the RF format at the other end by the backhaul transport equipment. This RF-based resource is then further conditioned within conditioner 76*a*, which is in this case, would simply amplify the resource signal to a power level acceptable for RF radiation out of the antenna at cell site 20A. After the signal is amplified, the resource signal is directed through the SRRS 74*a* and the switch will direct the resources to the selected sector of cell 20A that is in need of additional capacity. Thus, with this example, it should be appreciated that the reallocation of the radio resources is greatly simplified when the when the resources are centrally located within the CBTS 80 of the RRCMS 50.

Figure 4B:
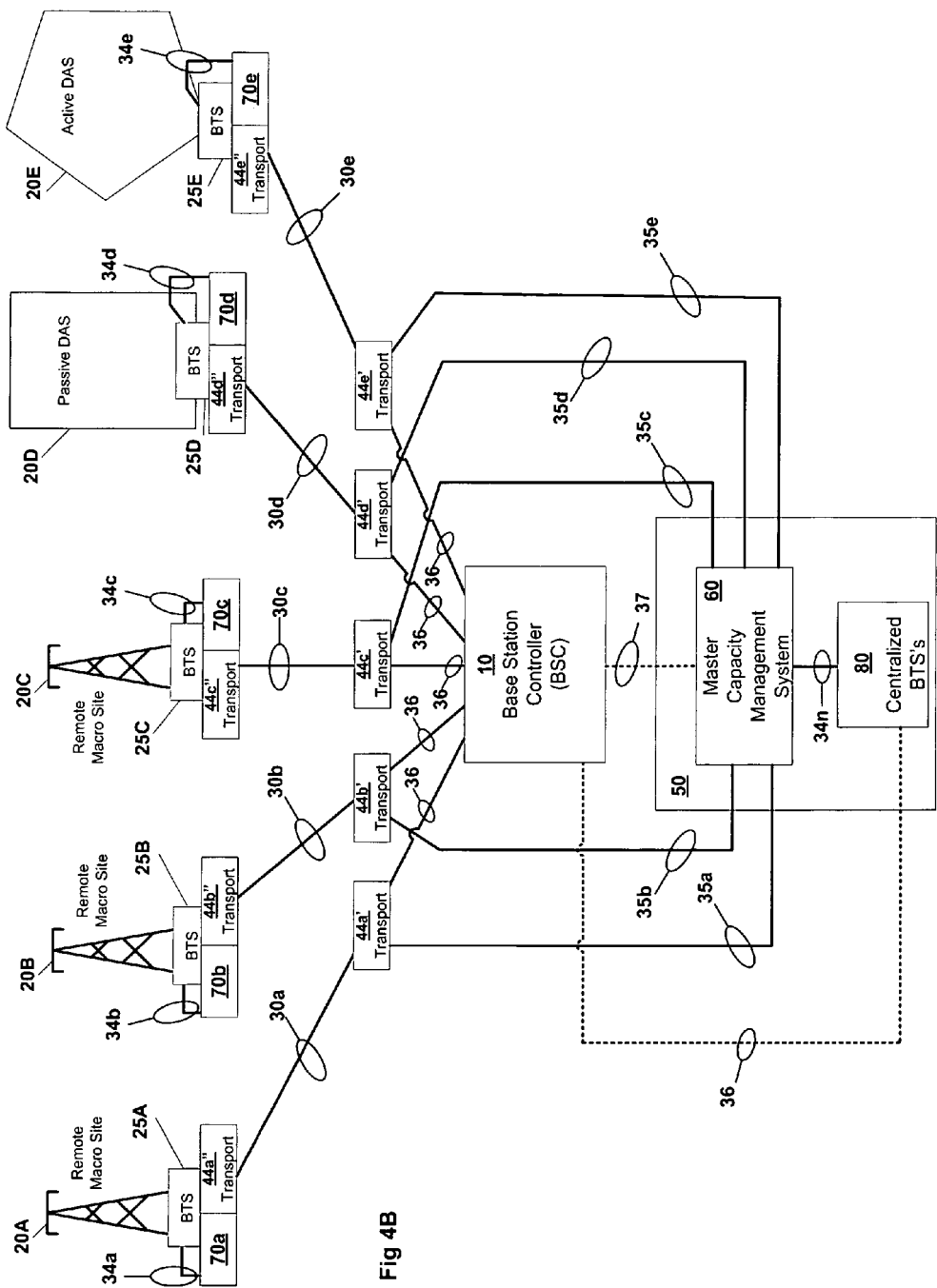
FIG. 4B is a diagrammatic representation of another aspect of the second embodiment of the present invention whereby a centralized base transceiver station is incorporated into the radio resource capacity management system and the interfacing of the radio resource capacity management system of the invention is through the backhaul transport means of the wireless cellular communications network.

Turning attention to FIG. 4B, a second aspect of the second embodiment of the invention will now be described. In this second aspect of the second embodiment, it is seen that a centralized base transceiver station 80 (CBTS) has also been added to the RRCMS 50, as well as a RF central conditioner 66*n*, although the central conditioner 66*n* is not shown in the figure, it is presumed to be disposed within the MCMS 60 as with FIG. 4A. In this aspect of the invention, it is seen that each of the independent backhaul transport means 35*a*-35*e* are not connected directly to the respective SCMS 70*a*-70*e*. Rather, they are connected to the respective first backhaul transport interfaces 44*a*'-44*e*' such that the radio channel resources that emanate from the CBTS 80 will be directed to the first transport interfaces 44*a*'-44*e*' and then into the existing and respective backhaul transport means 30*a*-30*e*, which are connected to a respective second backhaul transport interfaces 44*a*"-44*e*", which are in turn, connected to a respective slave capacity management systems 70*a*-70*e*. Once the radio channel resources are within the respective SCMS 70, the resources are further conditioned and distributed exactly as described with respect to the embodiment described in FIG. 4A.

Figure 5:
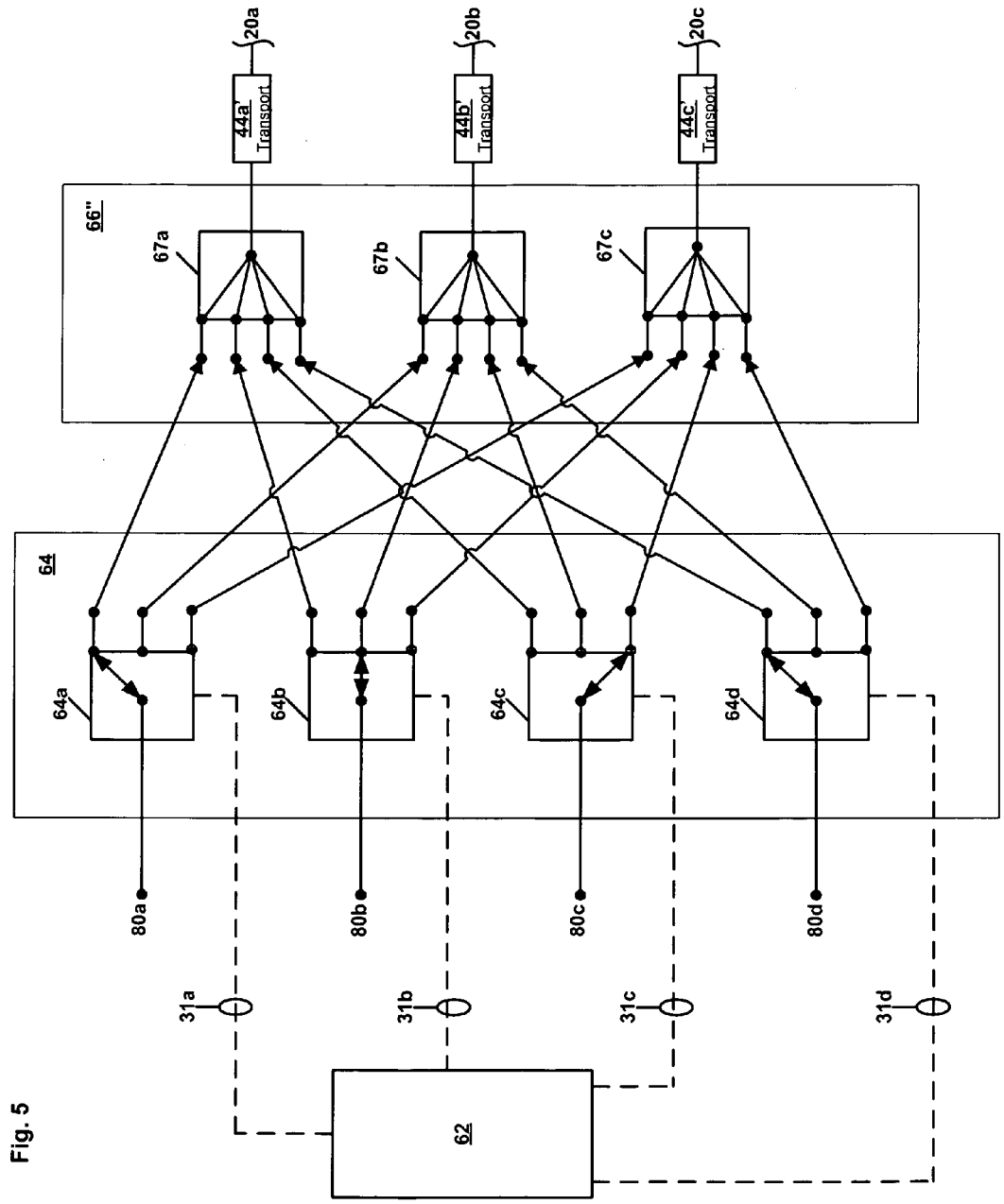

Turning attention now to FIG. 5, a switching scenario of the radio capacity from the centralized CBTS 80 to the target macro sites 20A-20C will be explained in order to provide two possible, but yet different advantages of providing centralized radio resources. In the first scenario, it will be presumed that all of the macro site radio resources from each respective BTS have been removed and have been relocated within the CBTS 80. In the second scenario, it will be presumed that the individual radio resources are still located at each respective BTS, but the CBTS 80 is now acting as a centrally-located redundant supply of radio resources that can be switched between the various macro cell sites in order to satisfy capacity deficiencies that may arise at a particular site or because a site may have completely lost all capacity due to an equipment malfunction. The RF resources in this example are shown to comprise four transceiver radios, 80*a*-80*d*. Moreover, it should be pointed out that this drawing figure presumes the resources have already been routed out of the CBTS 80 and have passed through the transport means 34*n*, and into the conditioner 66*n* of the MCMS 60. Furthermore, with this example, it will be presumed that the routed resources leaving the CBTS 80 have been conditioned to match the switching format of the CRRS 64. So, if CRRC 64 is a fiber optic switch, then the resources available at 80*a*-80*d* would be a fiber optic format. As seen in the FIG. 5 example, the CRRS 64 is seen to consist of a bank of four RF switches, identified as switches 64*a*-64*d*, wherein switch 64*a* is connected to radio 80*a*, switch 64*b* is connected to radio 80*b*, switch 64*c* is connected to radio 80*c* and switch 64*d* is connected to radio 80*d*. In this example, it is seen that macro site 20A requires radio resources from radio 80*a* plus additional capacity from radio 80*d*, which in this case, might be considered the redundant radio resource. It is also seen that the macro site 20B and 20C are receiving a single radio resource from CBTS 80 although they are connected to other potential radio resources in the event of a radio failure.

Each RF switch is shown to comprise a single pole, triple throw switch, although the invention is not to be limited to this particular type of switch. The type of switch will depend upon the application of how many radio resources are available and the number of cells that may be involved in the resource reallocation. For example, if the CBTS 80 is comprised of four radio resources and it is desired to reallocate one of the radio resources between two different remote cells, a single pole, double throw switch would be used instead of a triple throw switch. Thus, each radio resource within the CBTS 80 will have its own switch. Therefore, each switch will always be a single pole switch, but the number of throws of each switch will depend upon and correspond to the number of different macro or DAS sites that resources are to be reallocated between. As previously described in reference to the FIG. 4A drawing figure, and its description, the resources exiting CRRS 64 would always be passed through what would be considered an output conditioner. In this example, since the resources are being reallocated from the CBTS 80, there is no need for an input conditioner (66*a*), but rather the resources will only be passed through an output conditioner, in this case, the one labeled 66*n'*. Specific to this example, the output conditioner 66*n'* merely consists of a series of resource combiners, herein identified as 67*a*-67*c*. The conditioned resources exiting the respective combiners 67*a*-67*c* would then be routed to a respective backhaul transport interface 44*a'*-44*c'*. From the respective backhaul transport interfaces 44*a'*-44*c'*, the resources would eventually arrive at the macro sites 20A, 20B, or 20C, depending upon the reallocation needs. Prior to arriving at the respective macro sites, the resources will pass through respective independent backhaul transport means and respective slave capacity management systems, all of which were previously described with respect to FIG. 2A and FIG. 4A, and are not shown here. In this first scenario, there is tremendous cost savings advantage that can be realized by eliminating the redundant radio resource capacity that is dedicated to a macro cell site, as is the common practice today. It is conservative to estimate that millions of dollars could be saved by a service provider if they eliminate the redundant resources and provide a single cache of radio resources within a centralized base transceiver station. With the present invention, it is anticipated that cache would be limited in size to the actual, statistically-trended capacity needs of each macro site, plus a minimal amount of redundancy necessary for the entire macro cell site network that is serviced by the CBTS 80.

In the second scenario, the CBTS 80 serves only as a redundant resource, meaning that each base transceiver station has not had its radio resources removed to a centralized base transceiver station.

In this scenario, the invention is concerned with merely providing peak or additional resource capacity to a cell. In this way, the typical redundant resource capacity that is normally sitting idle at each macro site base transceiver station is now centralized. By centralizing the redundant capacity, the quantity of redundant capacity for the entire wireless cellular network can be tremendously reduced. Thus, the example in FIG. 5 could represent a situation where it has been statically pre-determined through trending data that only four radio resources 80*a*-80*d* would be required to fulfill the maximum amount of redundant capacity that the macro sites 20A-20C would typically require. For instance, if macro cellular site 20A was experiencing an unusual radio capacity usage, such as a night time sporting event, and the dedicated radio resources weren't adequate to handle all of the radio traffic, that macro cell site would need extra capacity in order to maintain adequate QoS threshold levels. To maintain those levels, macro 20A would need additional capacity resources from the CBTS 80. Here it is seen that the additional needs are being satisfied by adding resource capacity from radios 80*a* and 80*d*. It is also seen, that the neighboring macro sites 20B and 20C also have high than normal capacity requirements due the sporting event, and they too, are receiving extra capacity resources from the CBTS 80. Therefore, it should be appreciated, that even if the CBTS 80 is nothing more than a so-called, centralized, redundant radio resource, tremendous cost savings could still be realized through the reallocation of those centralized radio resources as taught by the present invention.

Figure 6A:
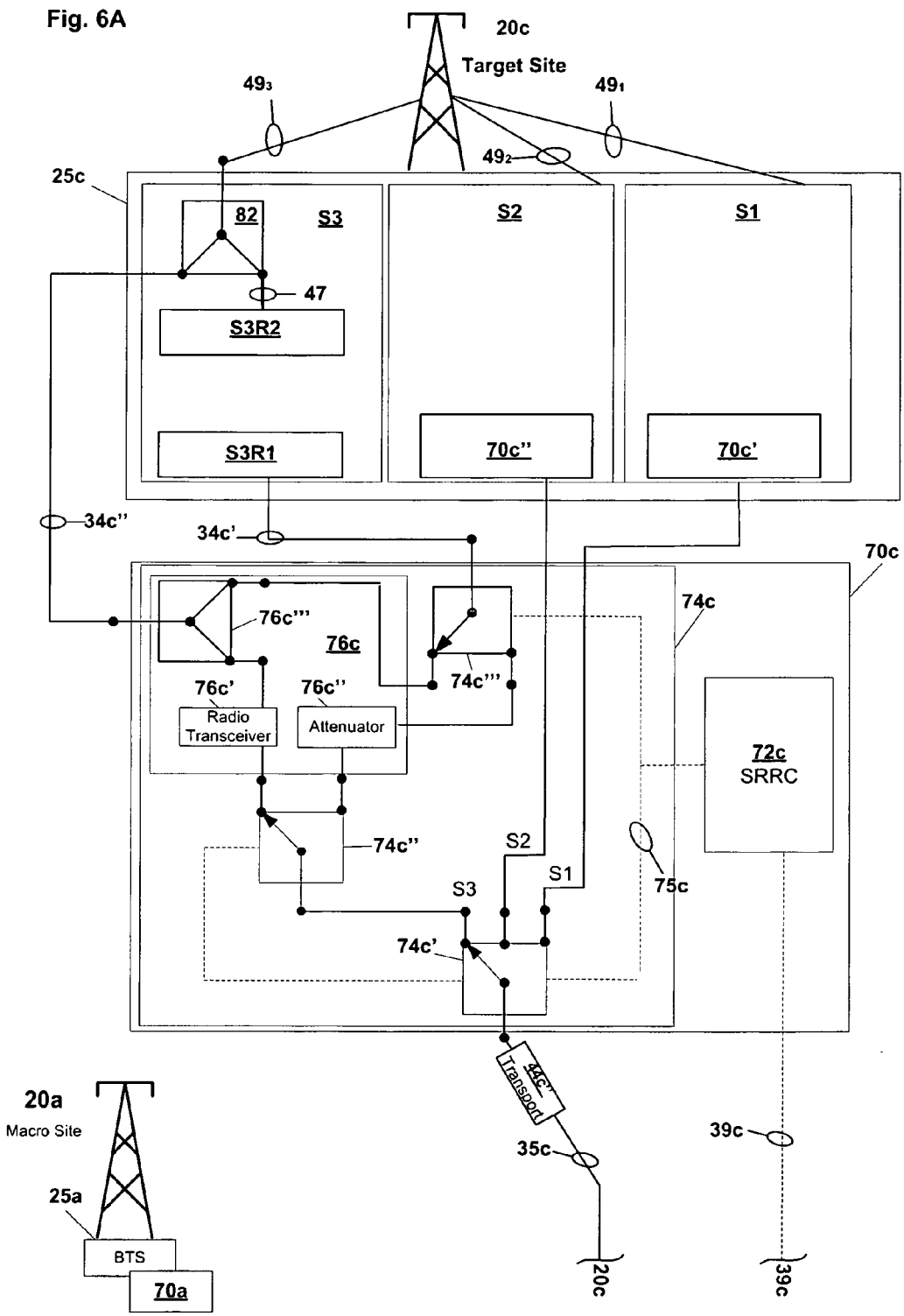
FIG. 6A is a diagrammatic representation emphasizing the routing of reallocated RF radio channel resources from a centralized base transceiver station through the various elements of the slave capacity management system to a sector of a target macro cell site.
Figure 6B:
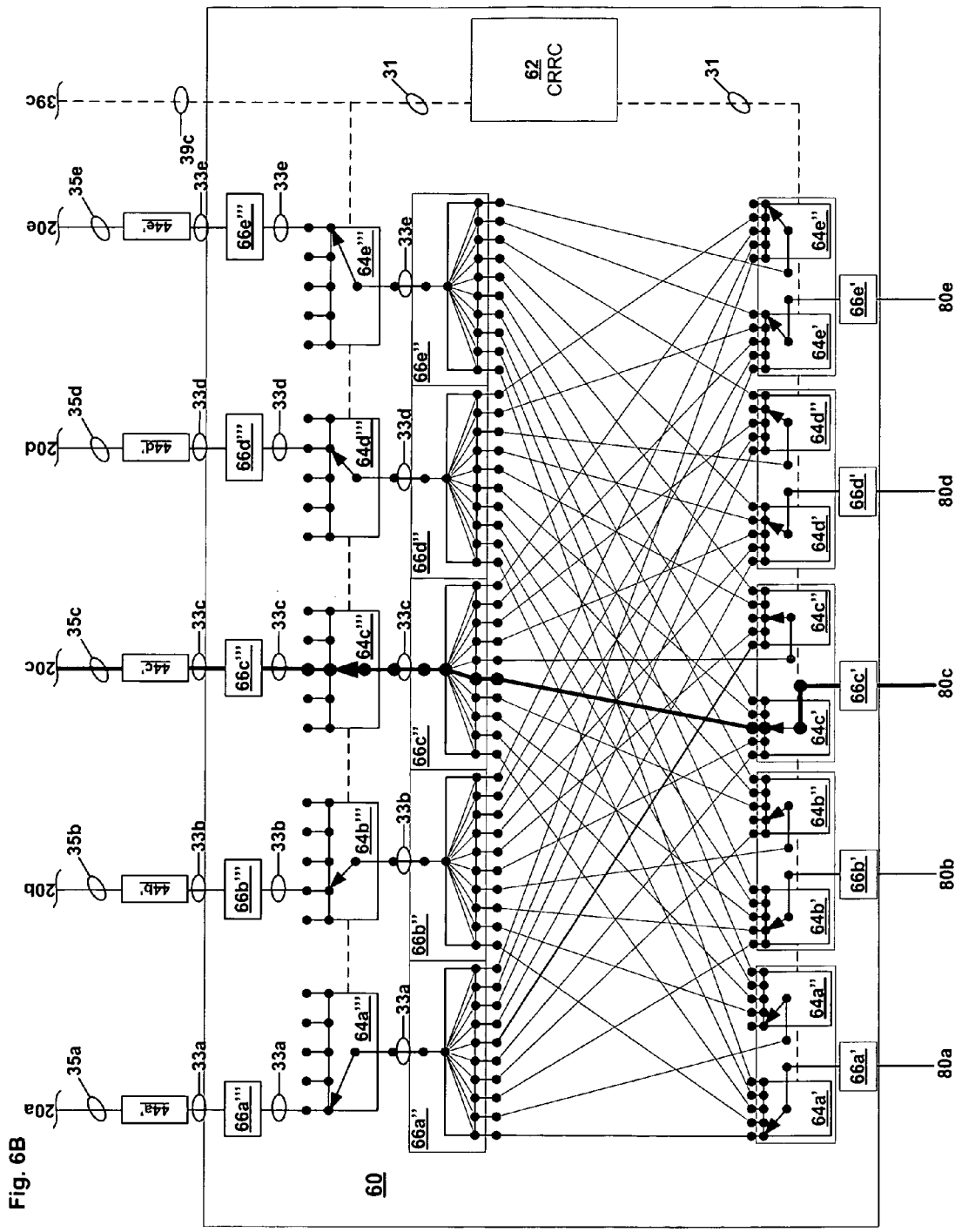
FIG. 6B is a diagrammatic representation emphasizing the routing of reallocated RF radio channel resources from a centralized base transceiver station through the master capacity management system, a component of the radio resource capacity management system of the present invention, to a target macro cell site.

Now turning attention to FIGS. 6A and 6B, a detailed diagrammatic representation of a suggested network arrangement is being provided to emphasize the interaction of the various components of the RRCMS 50 of the invention when the radio resources from a reservoir of available radio resources (80*a*-80*e*) within a CBTS 80, specifically radio 80*c*, are added to the target site 20C. This arrangement is also capable of adding resources from one of the other macro or DAS sites 20A, 20B, 20D and 20E, to the macro site 20C, in addition to the resources that are being provided by the CBTS 80. As previously pointed out in the FIGS. 3A-3B descriptions, certain presumptions are again outlined for FIGS. 6A, 6B. First, it will be presumed that macro site 25*c* will receive additional radio resource capacity from CBTS 80, specifically on radio resource traffic capacity 80*c*. Second, it has already been determined that macro site 20C requires a minimum of at least one radio resource, S3R2, that is continuously dedicated to sector S3 of macro site 20C to meet basic service needs. Third, it is also presumed that the CRRC 62, has already confirmed that the system configuration updates have been executed by the BSC 10, which must be verified prior to committing to a reallocation of the identified donor resources. Fourth, it is also presumed that the radio resources from any particular sector of any given network of macro or DAS sites (20A-20E), whether they are considered to be dedicated resources or potential donor resources, will be communicatively connected to that macro site's slave capacity management system, in this case 70*c*. Fifth, it should be understood that the independent backhaul transport means 35*c* shown in FIGS. 6A and 6B will consist of the same equipment as taught in FIG. 2A. Finally, in FIG. 6B, the heavy, dark line is intentionally provided to facilitate the description and understanding of how the resources are being routed through the MCMS 60. Now that all the presumptions have been set forth, the radio resource reallocation proceeds as follows. Initially, the CRRC 62 in FIG. 6B, will command the SRRC 72*c* of SCMS 70*c* via the data link 39*c*, in FIG. 6A, to configure the CRRS 74*c* such that the target switches and resources are ready for reallocation. To accomplish that end result, the SRRC 72*c* will sends a command through control circuit means 75*c*, directing the switches SRRS 74*c'*, 74*c"* and 74*c'''* to configure themselves so as to connect radio resource S3R1 of the third sector, to the appropriate transmission means 34*c'* and 34*c"* to be routed to combiner 82 which will pool the resources of radio S3R2 with radio S3R1 and radio 80*c*. Simultaneously, in FIG. 6B, CRRC 62 will command the CRRS 64 to configure its switches 64*a-e*, specifically switches 64*c'* and 64*c'''* in such a way that the radio resource 80*c* will be directed to the SCMS 70*c*, depicted in FIG. 6A. It is seen that radio S3R1, which is located in sector S3 of macro site 20C, is directly connected by transmission means 34*c'* to the SCMS 70*c*, while radio S3R2 is connected to combiner 82 of the BTS 25*c* through leg 47 and connected to the SCMS 70*c* through transmission means 34*c''*. As seen, the transmission means 34*c'* is permanently connected to switch 74*c'''* of SRRS 74*c*, while transmission means 34*c''* is permanently connected to the combiner 76*c'''* of the conditioner 76*c* and to the combiner 82 of the BTS 25*c*. The radio S3R2 is considered the dedicated sector radio because it is permanently connected to the combiner 82, which in turn, is permanently connected to the antenna of macro site 20C via leg 49$_3$ for providing cellular wireless service.

As shown in FIG. 6B, the relatively high-powered RF radio resource 80*c* pulled from CBTS 80 for reallocation purposes, is first passed through the conditioner 66*c'*. Conditioner 66*c'* is now comprised of an attenuator that will condition the resources by reducing the RF power to match the power rating requirements of the CRRS 64. After conditioning is performed, the reallocated radio resources are routed to switch 64*c'*, which then further routes the resources to the input conditioner 66*c''*. In this case, the conditioner 66*c''* is comprised solely of a combiner, where, if it is desired, additional resources from one or more of the other macro or DAS sites 20A, 20B, 20D or 20E could be pooled together at that point with the radio resource 80*c*, and then further routed onward. In this example, radio resource 80*c* will be the only resource that will be added to the existing radios S3R1 and S3*r*2 of macro site 20C. After the resources pass through the conditioner 66*c''*, they will then pass through the switch 64*c'''*, where they will continue through an output conditioner 66*c'''*. The output conditioner will ensure that the power requirements of the equipment that comprise the independent backhaul means 35*c* will be satisfied; otherwise this equipment could be destroyed. The conditioned resources then are routed through transport interface 44*c'* prior to entering the independent backhaul transport means 35*c*. The equipment of the independent backhaul transport means 35*c* converts the resources to a format that is matched to that which is required by backhaul means 35*c*, if needed. The resources are then received at the transport interface 44*c''* and then into the sector selector switch 74*c'* of the SRRS 74*c*. Switch 74*c'* passes the resource to switch 74*c''*, which routes the resource through an RF amplifier 76*c'* contained in conditioner 76*c*. After RF amplification, the resource is passed through combiner 76" within conditioner 76*c*. The radio resource 80*c* is combined with the radio resource S3R1, which is considered a non-dedicated resource. That resource is routed into switch 74*c'''* before entering combiner 76*c'''*. Thus, the combiner 76*c'''* has pooled the centralized radio resource 80*c* with the first radio of sector S3. Those combined resources then travel via RF transport means 34*c''* to the combiner 82 that is located within the third sector (S3) of BTS 25*c*. Once the combined resource pass into combiner 82, they are further combined with the dedicated resource of radio S3R2, thereby satisfying the capacity requirements of macro site 20C. The total combined resources are then routed through the transport means 49$_3$ to the macro site's antenna.

In any wireless cellular communications system, there may be significant transmission delays when the donor RF radio resources are reallocated to and/or combined with a target cell's resources as a result of the physical distances between the donor and target cells and because delays are introduced each time the resources pass through the various components of the system and the components of the invention itself. As mentioned earlier, before the radio resources can actually be reallocated, the time delays must be accounted for and loaded into the BSC 10 in order for the reallocated resources to be in phase with the target cell's radio resources. Only under uncommon circumstances where the base transceiver station of the donor and target sites are physically in very close proximity would it not be necessary to account for the system time delays. The reason is that most base transceiver station equipment can internally account for very slight time delays without the need to additionally account for them. One way to account for the delays is to assign a time delay to each of the backhaul transport means segments and for each of the components as well. For instance, if it is assumed that each component comprising the RRCMCS 50 of the invention, as well as all of the backhaul transports that are in communication with the RRCMCS 50, are of a fiber optic format, it is common knowledge in the industry that when approximating the time delay for a given number of feet of each segment of fiber optic cable, the time delay figure for that segment is typically presented in nanoseconds and is arrived at by multiplying the total distance in feet of the fiber optic run, by the fiber optic core clad time delay figure. For example, when using fiber optic cable of a standard diameter, the time delay figures that is set by manufacturers for the standard cable size would be 1.48 nanoseconds per foot. Thus it should be appreciated when computing the time delay of all the components of the communications system, there will be miles of fiber optic segments, thereby creating significant time delays in the backhaul transmission segments alone. However, there are also associated time delays each piece of equipment that the signal must pass through and those delays also contribute to the overall system time delays. Therefore it is critical to account for such time delays or else if a radio's resources, say from macro site 20A, were reallocated to macro site 20E, the system time delays would prevent the reallocated resources from being in phase alignment with the target cell's base transceiver system radio resources, thereby making the reallocated resources essentiality unusable.

Figure 7A:
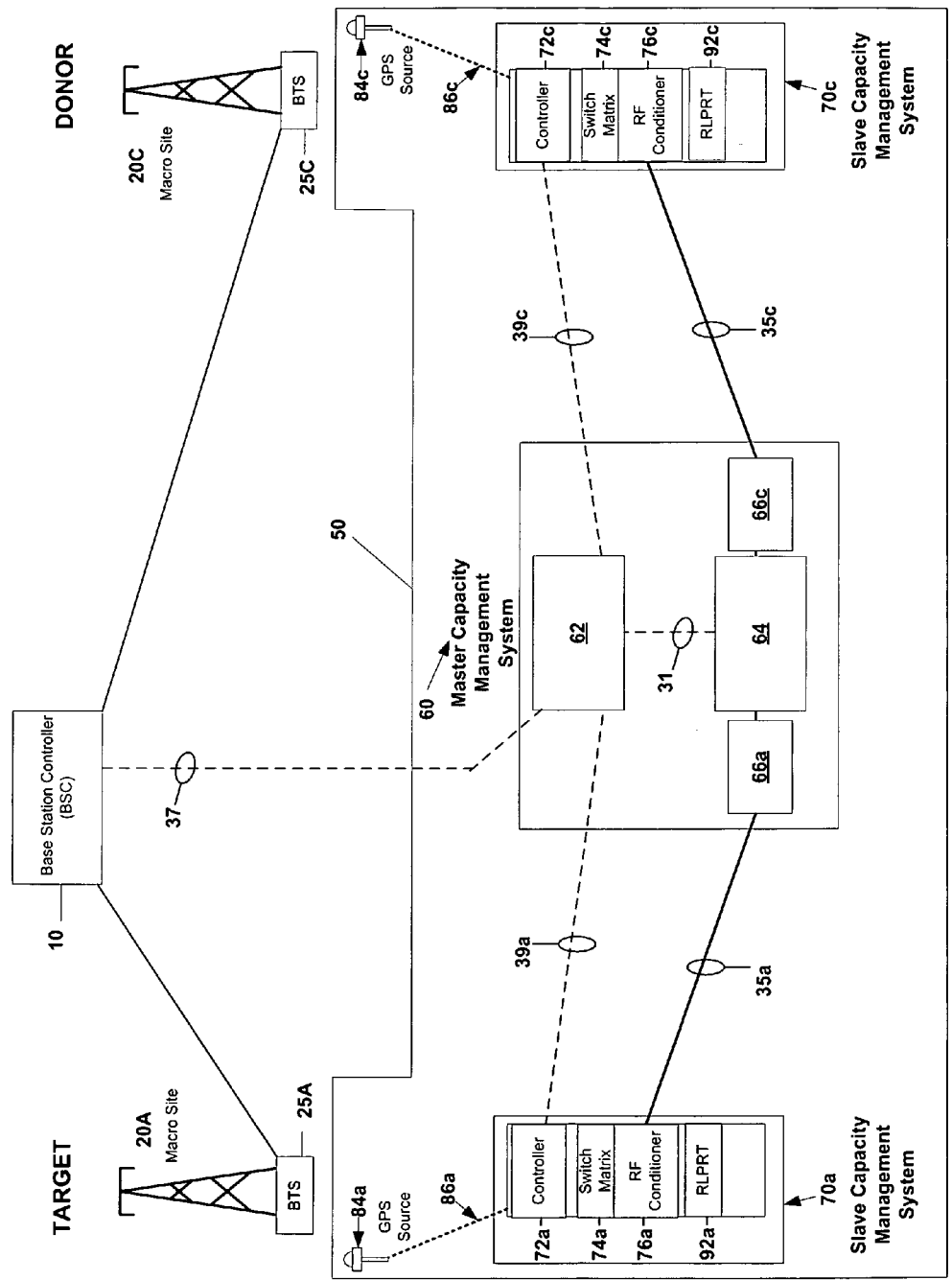
FIG. 7A is a diagrammatic representation of third embodiment of invention showing a GPS time delay system being incorporated into the radio resource capacity management system of the present invention.

In FIG. 7A, a diagrammatic representation is shown of third embodiment of the invention which proposes a means for addressing and solving the critical transmission delay issue. This embodiment will accurately compute the time delays a radio channel resource will experience while it is being reallocated within a cellular network. The time delay computation is performed independent of manually computing a time delay, which requires actual knowledge of the total number of components that the reallocated resource must pass through, as well as the physical distances of each fiber optic and coaxial cable segment that the reallocated signal will pass through. The methodology of this embodiment dispenses with the inaccuracies of a manual computation by incorporating the use of an extremely accurate GPS time delay system into the radio resource capacity management system 50. In describing the FIG. 7A embodiment, it will be assumed that the macro site 20A will be receiving radio channel resources from donor macro site 20C and that the cellular communications network consists of only five macro and DAS sites, 20A-20E. The GPS time delay system is comprised of a respective GPS timing source unit at each macro and DAS site and a programmable two-way radio transceiver system that operates at a very low power. In this particular example, the two-way radio system is comprised of the two remote programmable two-way radio transceiver 92*a* and 92*c* that are incorporated into the respective slave capacity management systems 70*a* and 70*c*, which are dedicated to each of the macro and DAS sites within the local network. It should be understood that the two-way radio system will always be comprised of two radios, one at the target site and one at the donor site. The GPS timing source units 84a and 84c are also a part of the GPS time delay system and they are also shown to be communicatively connected to the respective slave capacity management controllers 72a and 72c via a respective bi-directional data link 86a and 86c. Although FIG. 7A only shows sites 20A and 20C of the local network, all of the sites that comprise the local network will have their own timing source unit and their own two-way programmable radio transceiver incorporated into its respective slave capacity management system. The GPS timing source units 84a and 84c transmit a continual stream of GPS digital timing information into its respective controller 72a or 72c, although that information will only be utilized by the respective controller when it is alerted that a time delay computation it to be made. With the GPS time delay system being incorporated into the RRCMS 50, it is now possible to precisely determine how long in nanoseconds, a reallocated resource which is being removed from the donor site 20C, will take to arrive at the target site 20A. Without the GPS time delay system, a manual time delay computation would have to consider the fact that the reallocated resources will pass through SMCS 70c, independent backhaul transport means 35c, MCMS 60, independent backhaul transport means 35a, and then finally into SCMS 70a, and all of the components' connection legs. If the radio resource capacity system of the second aspect of the second embodiment of the invention were employed (See FIG. 4B), the reallocated resources would additionally pass through backhaul transport interfaces 44 and through the backhaul transport means 30, further contributing to the timing delays. Thus, it can be appreciated that manually computing the timing delays would be a daunting task without a GPS time delay system being incorporated into RRCMS 50.

Figure 7B:
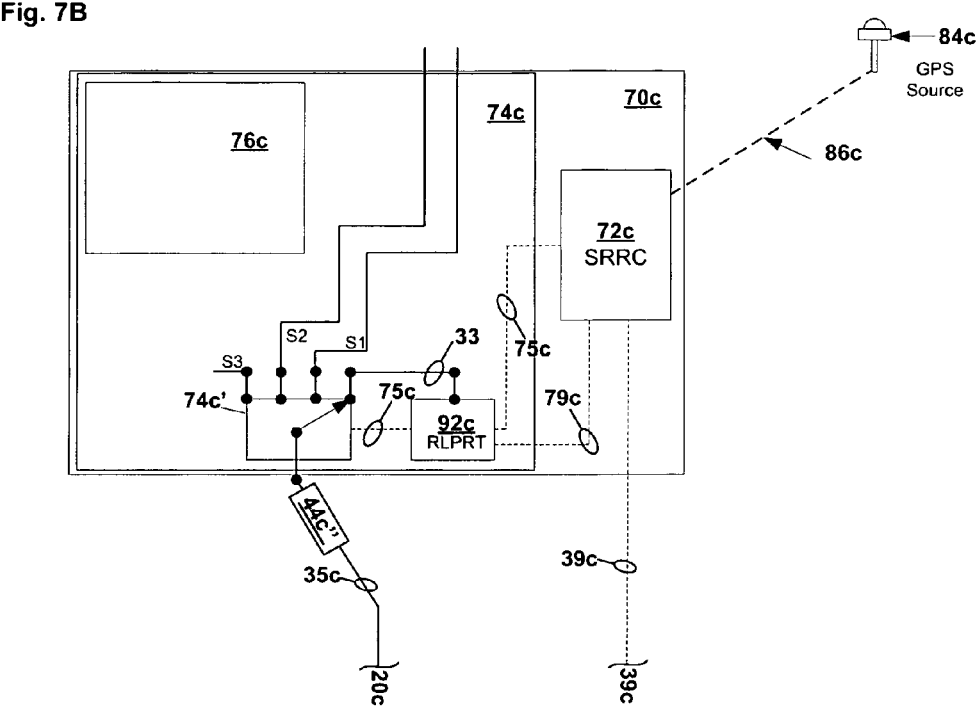
FIG. 7B is a diagrammatic representation of the GPS time delay system emphasizing the components of this system which are incorporated into the slave capacity management system.

To initiate the differential timing compensation process, the CRRC 62 of the MCMS 60 will have already determined which site will be the donor site and which site will be the target site. Based on that information, the CRRC 62 will send a simultaneous command signal via the respective bi-directional data links 39a and 39c to each respective SRRC 72a and 72c of the SCMS 70a and 70c. This command will simultaneously direct each of the respective controllers 72a and 72c to initiate an identical time stamp software program within its respective controller. Even though the programs are identical, there are different aspects within the program that are initiated, depending upon a site being categorized as a donor or target site. Independent of the site categorization, each respective timing unit source 84a and 84c will be continuously sending GPS timing or clocking information to its respective controller, SRRC 72a and 72c. However, two different actions will be undertaken which are dependent upon the site categorization. Since macro site 20C has been categorized as the donor site, the SRRC 72c, through its internal timestamp software, will create a digital timestamp data packet at the precise moment in time when it was directed to initiate its time stamp program. The timestamp data packet is comprised of a GPS time stamp and a GPS unit identifier, in this case, 84c. Simultaneously, the SRRC 72a has been directed to begin its timestamp software program and because site 20A has been categorized as the target site, its software program will take a clocking or time stamp snapshot at the moment of the software initiation. That time stamp snapshot is communicated via the bi-directional data link 86a into the SRRC72a, where it may either be saved for eventual transmission to the CRRC 62 or that time stamp data information can be immediately forwarded onto the CRRC 62. Referring now to FIG. 7B, it is seen that once the SRRC 72c compiles its digital time stamp data packet, that data packet is communicated via the bi-directional data link 79c to the remote, programmable two-way radio transceiver 92c (herein called RLPRT), which incorporated into the slave capacity management system 70c. The two-way radio transceiver 92c then converts the digital data packet information into an RF signal that is modulated onto a predetermined, RF narrow band radio frequency, where the signal is then passed through transport means 33, which may be either fiber optic or coaxial cable. If the transport means 33 is fiber optic, then those in the art would be aware that an RF-to-fiber optic light conversion would have to be initiated prior to the transmission being routed through to the switch 74c'. It is seen that switch 74c' has been configured such that one of its throws is dedicated to connection with the RLPRT 92c. Turning again to FIG. 7A, it is seen that the RF signal containing the timestamp data packet is then passed through the donor independent backhaul transport means 35c, the input conditioner 66c, the CRRS 64, the output conditioner 66a, then through the independent backhaul transport means 35a before being received into the SRRS 74a of SCMS 70a. The SRRS 74a has a dedicated throw, 74a', which is connected to the RLPRT 92a via a transport means 33, which can either be a fiber optic or coaxial cable. The signal is then demodulated and the time stamp data packet information is then communicated via a bi-directional data link 79a into the SRRC 72a. The routing of the data packet signal, once received within the SCMS 70a, is exactly the reverse of that described with respect to the data packet signal being routed out of the SCMS 70c. Therefore, the components 74a, 92a, and the transport means 33, have not been shown in the drawing figures as one in the art should readily understand the reverse signal flow pathway.

At the precise moment the SRRC 72a receives this timestamp data packet from SRRC 72c, the SRRC 72a takes another time stamp snapshot of its GPS time at its macro site. In this way, the SRRC 72a compares the time that the data packet arrived with the time that the data packet was sent. The difference in time represents the exact time delay that the reallocated RF resources would experience while being routed through that same pathway when going from site 20C to site 20A. This known time delay information is then conveyed by the SRRC 72a to the CRRC 62 via the data link 39a and the CRRC 62 then uploads that information via the data link 37 to the BSC 10. This uploaded information is used by the BSC 10 to perform a respective system reconfiguration relating to each of the base transceiver stations 25a and 25c in order to properly account for the transmission delays between those macro sites and the respective sites that neighbor each of those macro sites. Only after the BSC 10 inputs and reconfigures the system, can the donor resources be reallocated from the donor site to the target macro site as the time delay information will now ensure that the donor RF resources are in substantial phase with target RF resources. Another very important function of the CRRC 62 is to continuously query the BSC 10 to ensure the system reconfiguration has occurred within BSC 10, and once this confirmation has been acknowledged by CRRC 62, then the CRRC 62 send commands signal to SRRC 72c and to SRRC 72a to physically throw their respective switches within the respective SRRS 74c and 74a that will complete the circuitry which will facilitate the reallocation of the RF resources from donor 20C to target site 20A.

Figure 7D:
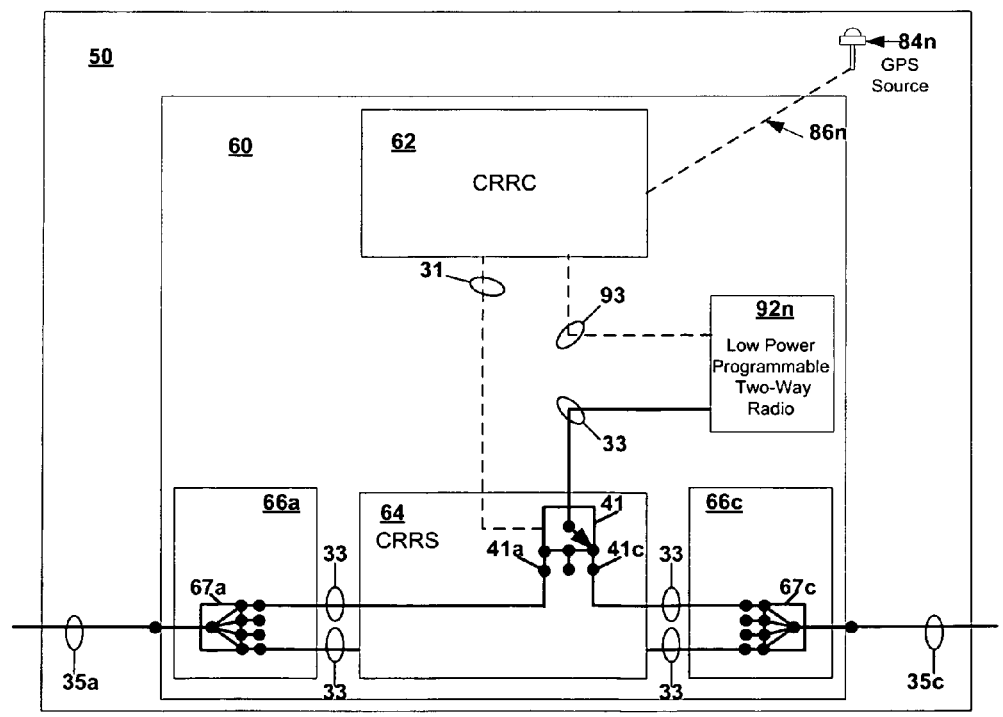
FIG. 7D is a diagrammatic representation of the centralized GPS time delay system emphasizing the components of this system which are incorporated into the slave capacity management system.
Figure 7C:
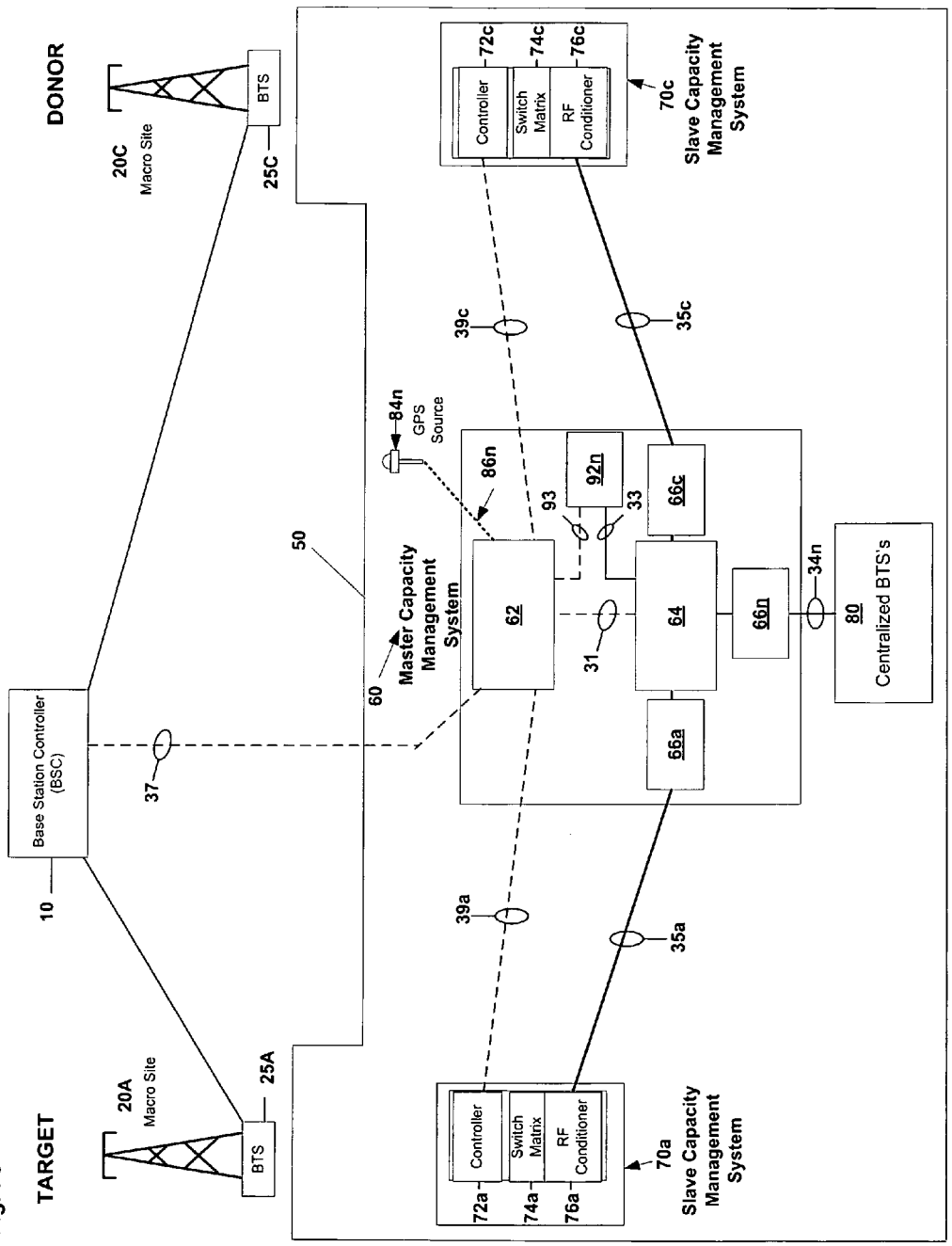
FIG. 7C is a diagrammatic representation of another aspect of the third embodiment of invention showing a GPS time delay system being centrally located within master capacity management system of the present invention.

A second aspect of the third embodiment of the invention is exemplified in FIG. 7C, which provides a detailed diagrammatic representation of a centralized GPS time delay system within the RRCMS 50. Although the RRCMS 50 is shown to include a centralized BTS 80 and the conditioner 66n, this second aspect will not depend upon the RRCMS 50 including those components because the radio channel resources with respect to this second aspect will be reallocated from donor site 20C to the target site 20A. The third aspect of the third embodiment, which will be described later herein, will utilize those two components. Here, the centralized GPS time delay system is seen to comprise a single GPS timing source 84*n* and a lone, centralized programmable two-way radio transceiver 92*n* (hereinafter CLPRT). With this second aspect, it is preferable to locate the GPS timing source 84*n* within the MCMS 60. The individual GPS timing source units (84*a*-84*e*) and the individual two-way radio transceivers (92*a*-92*e*) have been eliminated in order to centralize all time delay computations. Here, centralized GPS timing source 84*n* is interfaced to the CRRC 62 via the bi-directional data link 86*n*, which transmits a continuous digital timing data stream being emitted from the GPS source 84*n* into the CRRC 62. With this aspect, it is preferable to locate the GPS timing source 84*n* within the MCMS 60. However, the CRRC 62 will only use that information at a point in time when it has determined that a macro site is in need of additional radio channel resources. In this aspect, once that determination has been made, the CRRC 62 initiates its internal time stamp software program, which causes the CRRC 62 to send a directive command to the donor and target site controllers SRRC 72*a* and 72*c* via respective the bi-directional data links 39*a* and 39*c*, to configure themselves into a configuration that will perform a loop back circuit test. The loop back circuit configuration arranges the donor and target switches, SRRS 74*a* and SRRS 74*c*, so that any signal received at the respective switch 74*a* and 74*c*, will be returned to the MCMS 60 through a respective independent backhaul transport means, 35*a* and 35*c*. Once the CRRC 62 confirms that each respective SRRC 72*a* and 72*c* has configured itself into the loop back configuration, the CRRC 62 will register a first time stamp at the moment of confirmation, storing that time stamp and simultaneously creating a digital data packet that is comprised of the time stamp and a macro or DAS site identifier. That digital data packet is sent to the CLPRT 92*n* via the bi-directional data link 93, where the digital time stamp packet information is converted and/or modulated onto a narrow band RF frequency and this RF data packet signal transmitted is then transmitted out of the CLPRT 92*n* through the transport means 33 into the CRRS 64. The transport means 33 will either be a fiber optic or coaxial cable.

Turning attention to FIG. 7D, it is seen that the CRRS 64 contains a central compensation switch 41, which is strictly dedicated to the delay timing computation functions. It is to be understood that FIG. 7D is only showing the components that are necessary to explain the functionality of the centralized time delay system. For example, the CRRS 64 only shows switch 41 although the CRRS 64 will be comprised of a multitude of switches (See FIG. 6B). Likewise, the conditioners 66*a* and 66*c* are only showing a single combiner which is specifically dedicated for use with respect to the timing delay compensation process. The RF data packet signal is then routed from the pole of the switch 41 to the throw 41*c*, which is dedicated macro site 20C. The RF data packet signal is then routed onto the dedicated transport means 33 that is connected to the combiner 67*c* of the conditioner 66*c*. From the conditioner 66*c*, the signal is routed out of the RRCMS 50. Turning again to FIG. 7C, once the RF data packet signal exits RRCMS 50, the signal would then be routed into the independent backhaul transport means 35*c*, then through the slave capacity management conditioner 76*c*, which then routes the time stamp packet through the switch matrix, SRRS 74*c*. The SRRS 74*c* will then loop the time stamp data packet back through the slave capacity management conditioner 76*c* and out of the SCMC 70*c*, where it is returned to the RRCMS 50 through the same respective pathways as immediately described above, such that the signal eventually arrives at the CRRC 62. At the moment the CRRC 62 receives the returned signal, it takes another time stamp from the GPS timing source 84*n*. The CRRC 62 will then compute the time delay for the 20C network leg by subtracting the times that the signal was sent and the time that the signal returned. That time delay is then stored within the CRRC 62. The CRRC 62 will send a command signal via the control link 31 to the switch 41, telling it to reconfigure itself so that throw 41*c* is changed to throw 41*a*, which is dedicated to macro site 20A. The CRRC 62 then generates a second time stamp and a second time stamp data packet. The second time stamp is stored within CRRC 62 and the second time stamp data packet is routed from CRRC 62 out to the macro site 20A in the exact fashion that was described in FIG. 7D with respect to routing of the first time stamp data packet. Thus, the time stamp data packet which emanates from the CRRC 62, is routed into the bi-directional data link 93, then into the CLPRT 92*n*, then into switch 41. From the pole 41*a* of switch 41, the signal is then routed through transport means 33 into the combiner 67*a* and then into the independent backhaul transport means 35*a*, where the signal is then routed into the conditioner 76*a* and the SRRS 74*a*, whereby the signal is looped back through those same two components and back into the independent backhaul means 35*a*, where it is routed into the combiner 67*a*, the switch 41, the transport means 33, the CLPRT 92*n*, the bi-directional data link 93, and then finally into the CRRC 62. At the moment the CRRC 62 receives the second returned signal, it takes another time stamp from the GPS timing source 84*n*. The CRRC 62 will then compute the time delay for the 20A network leg by subtracting the times that the second signal was sent and the time that the second signal returned. That time delay is then stored within the CRRC 62. The CRRC 62 will then determine the exact time delay that would be encountered in reallocating the radio channel resources from macro site 20C to site 20A by dividing each leg's time delay duration in half, and then adding the two together. This known time delay information is then conveyed by CRRC 62 via the data link 37 to the BSC 10, whereby once the upload is completed, the CRRC 62 then commands the BSC 10 to perform a respective system reconfiguration relating to each of the base transceiver stations 25*a* and 25*c* in order to properly account for the transmission delays between those macro sites and the respective sites that neighbor each of those macro sites. As explained above, the CRRC 62 will continuously query the BSC 10 to ensure that system reconfigurations have occurred within BSC 10, and once these confirmations have been acknowledged by CRRC 62, then the CRRC 62 will send command signals to the SRRC 72*c* and SRRC 72*a* to physically throw the respective switches within SRRS 74*c* and 74*a* that will complete the circuitry which will facilitate the reallocation of the RF resources from donor 20C to target site 20A.

Turning again to FIG. 7C, a third aspect of the third embodiment of the invention will now be described. This aspect assumes that the RRCMS 50 now includes the centralized base transceiver station CBTS 80, which is connected to conditioner 66*n* via the transport means 34*n*. In this third aspect, the radio channel resources are to be reallocated from CBTS 80 to the macro site 20A using the same centralized GPS time delay system that was incorporated into the RRCMS 50 and previously described with respect to FIG. 7C. With this aspect, the timing source 84*n* may be located and in direct communication with the CBTS 80. To initiate the timing delay computation process in this third aspect of the third embodiment, the CRRC 62 sends a control directive signal to the slave capacity management controller SRRC 72a to configure its SRRS 74a into the same loop back test circuit that was described above with respect to the second aspect of the third embodiment. Once the confirmation of the loop back switch configuration is confirmed by the CRRC 62, the CRRC 62 will then perform the exact steps of the time delay computation process that were described above with respect to the second aspect of the third embodiment. Therefore, a detailed description of that same process will not be provided here. However, for the sake of brevity, since the resources are being allocated from the CBTS 80, only the time delay for the 20A network leg will be needed. Once the CRRC 62 computes that leg's time delay, that time delay information will be uploaded via the data link 37 to the BSC 10. When that upload is completed, the CRRC 62 then commands the BSC 10 to perform a respective system reconfiguration relating to the base transceiver station 25a and its neighboring sites in order to properly account for the transmission delay between the CBTS 80 and the macro site 20A. As explained above, the CRRC 62 will continuously query the BSC 10 to ensure that system reconfiguration of BTS 25a has occurred within BSC 10, and once this confirmation has been acknowledged by CRRC 62, then the CRRC 62 will send command signals to the SRRC 72a and to CRRS 64 to physically throw their switches that will complete the circuitry which will facilitate the reallocation of the RF resources from CBTS 80 to target site 20A. The time delay information will be accounted for by the CRRC 62, and updates sent to the BSC 10 will be confirmed by the CRRC 62 before the resources are reallocated from CBTS 80 to macro site 20A.

In still another aspect of the third embodiment, it will be assumed that the CBTS 80 and the centralized GPS time delay system have been incorporated into the RRCMS 50 and that macro site 20A will require additional radio channel resources from macro site 20C and from the CBTS 80. In this aspect, since the resources will be reallocated from macro site 20C over to macro site 20A, the time delay computation related to those reallocated resources will be determined in the same manner as was described above with respect to FIG. 7C. Likewise, since additional resources will be reallocated from CBTS 80 to macro site 20A, the time delay computation related to those reallocated resources will be determined in the same manner as was described immediately above with respect to the third aspect of the third embodiment. Thus, there will be two different time delays that will be computed with this aspect and each will have to be separately considered by the CRRC 62 prior to the actual reallocation being made. This known time delay information for each of the respective reallocated resources is then upload via the data link 37 to the BSC 10. This uploaded information is used by the BSC 10 to perform a respective system reconfiguration relating to each of the base transceiver stations 25a and 25c, in order to properly account for the transmission delays between those macro sites and the respective sites that neighbor each of those macro sites. Likewise, the same system reconfiguration must be performed with respect to the transmission delays between the base transceiver station 25a and the resources that are associated with the centralized base transceiver station 80. However, the resources from CBTS 80 are not always emanating from the physical location of the CBTS 80, meaning that the resources that are being assigned to macro site 20A could have been previously assigned out from the physical location of the CBTS 80 to another macro site, say site 20X, and therefore, the macro site 20X and its neighboring sites must also be reconfigured by BSC 10, to account for the removal of those resources. Only after the BSC 10 inputs and reconfigures the system, can the resources be reallocated from the donor site 20C and from the CBTS 80 to the target macro site 20A, as the time delay information will now ensure that all donor RF resources are substantially in phase with the target RF resources. As explained above, the CRRC 62 continuously queries the BSC 10 to ensure the system reconfigurations have occurred within BSC 10, and once this confirmation has been acknowledged by CRRC 62, then the CRRC 62 send commands signal to SRRC 72c and SRRC 72a, to physically throw their respective switches in a manner that will complete the circuitry for facilitating the reallocation of the RF resources from donor 20C to site 20A. Likewise, CRRC 62 sends a command signal to the SRRC 64 to throw its switch to complete the circuitry for facilitating the reallocation of the RF resources from the CBTS 80 to site 20A.

Figure 8:
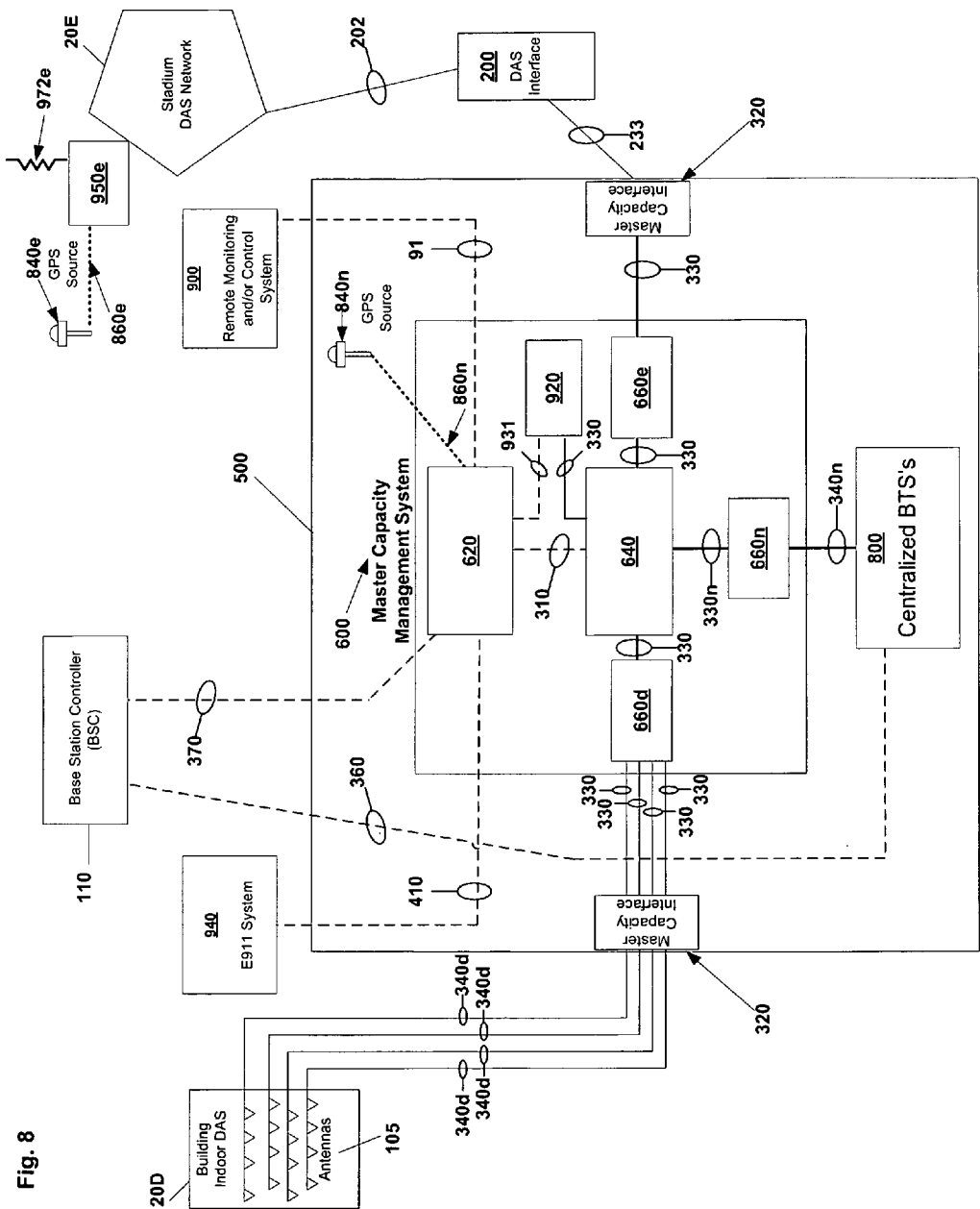
FIG. 8 is a diagrammatic representation fourth embodiment of the present invention whereby the local cellular wireless communications network is comprised of only active and passive DAS sites, emphasizing another aspect of the GPS time delay system being incorporated into the radio resource capacity management system of the invention.

Turning now to FIG. 8, a fourth embodiment of the invention will now be described and it is important to understand that with this embodiment, the wireless cellular communications network is comprised of only distributed antenna systems, or DAS sites, wherein DAS site 20D is envisioned as being located within an office building and DAS site 20E is located within a sports stadium. In describing this embodiment, it will also be presumed that CRRC 620 has already determined through the continuous interaction with BSC 10 via the bi-directional data link 370 that each of the DAS sites 20D and 20E are in need of additional radio channel resources. Additionally, it is also being presumed that site 20D is considered to be a passive DAS site while site 20E is considered to be an active DAS site. When a cellular wireless communications network is comprised of only passive DAS sites, the fourth embodiment of the invention does not require the use of a GPS time delay system, but when a network is comprised only of active DAS sites or is a mix of active and passive DAS sites, then the RRCMS 500 may include a GPS time delay system. In FIG. 8, site 20E will be considered to be active DAS site because it will be presumed to be a very long distance away from the CBTS 800, thereby necessitating some forms of RF signal conditioning. When certain forms of signal conditioning are performed, the RRCMS 500 will include a GPS time delay system. In this fourth embodiment, all radio channel resources that are to be reallocated, will emanate from the reservoir of radio channel resources that comprise the CBTS 800, which is also a component of the RRCMS 500. Since these reserve resources are not being reallocated to or from remote macro sites, there is no need for the provision of slave capacity management equipment or the associated independent backhaul transport means equipment. Moreover, with a passive DAS site or a entirely passive DAS network, there will be no need to provide radio channel resource signal conditioning in the form of resource signal re-amplification when the RRCMS 500 and the radio channel resources of the CBTS 800 are in close physical proximity to each other. In most cases, and with the example being described through FIG. 8, the RRCMS 500 and the CBTS 800 will be located together within the same building or stadium that is employing the distributed antenna system. However, with passive DAS networks or sites, there will probably be the need for some other form of signal conditioning besides re-amplification, such as resource combining and/or splitting. When the physical location of the RRCMS 500 and hence the radio resources of CBTS 800 are further and further routed away from its origin and/or split, the need for an active DAS site will arise.

In the first situation, where the resources of CBTS 800 of the RRCMS 500 are relatively in close approximation to the antennas 105, the only signal conditioning that will be required is that of signal splitting, which occurs within the conditioner 660*d* of the MCMS 600. There will be no need for signal re-amplification since the radio channel resources emanating from CBTS 800 will be of sufficient power to properly radiate from each of the distributed antennas 105 comprising the passive DAS site 20D. Thus, the conditioner 660*n* will perform no signal re-amplification prior to the resources of CBTS 800 being routed into the CRRS 640. The resources will be routed from CRRS 640 into the transport means 330 prior to entering the conditioner 660*d*, which in this case, would be considered the output conditioner of the RRCMS 500. As seen, the reallocated resources enter conditioner 660*d* as a single input and leave the conditioner as four outputs. To accomplish this transition, conditioner 660*d* would comprise a four-to-one signal splitter. Thus, this arrangement is presuming that site 20D only requires one radio channel to be reallocated in order to satisfy its deficiencies. If more than one radio channel resource was being provided by the CBTS 800, then the conditioner 660*n* would perform a combining conditioning of those resources prior to sending a single, combined resource into the CRRS 640. In either case, a single radio channel resource signal would be routed into the conditioner 660*d* prior to exiting the MCMS 600, where it is seen that the split signal would then be routed into the master capacity interface 320 (hereinafter MCI). Since an independent backhaul transport means is no longer provided as was with the previous embodiments, a master capacity interface 320 is required for the RF transmission means 340*d* to receive and further couple the resources onto their final destination. In this case, each of the segments of the RF transmission means 340*d* will be comprised of four identical cables, each of the cables always being a coaxial cable since the reallocated resources are of an RF format. The reallocated resources are then communicated through each transmission means 340*d* to the various distributed antennas 105 that comprise the passive DAS site 20D. In the example, the DAS site 20D is shown to be located within an office building wherein each of the RF transmission means 340*d* terminates at a different floor of the building. With a passive DAS arrangement, there is no need to account for the time signal delays since the physical distances would not warrant such adjustment. However, with an active DAS site, a time delay stamp would be needed because the resources which are being reallocated would require signal re-amplification and various forms of signal conditioning due to the distances between the active DAS site 20E and the CBTS 800 or because the size of the distributed antenna system is so large that the radiating power out of each of the individual antennas within the system will not support proper quality of service.

When the CBTS 800 is relatively far away from the distributed antenna system, or DAS site, the reallocated resources emanating from the CBTS 800 will require radio channel signal re-amplification and other forms of signal conditioning. Thus, whenever a DAS site requires re-amplification and/or other signal conditioning, it will be considered to be an active DAS site. Active DAS sites will also require a GPS time delay system to be incorporated into the RRCMS 500 as a means to account for time delays that occur as a result of the physical distances between the CBTS 800 and the DAS site itself, in this case site 20E. The GPS time delay system that is a part of this invention is comprised of the GPS timing source 840*n*, the GPS timing source 840*e*, the GPS control interface 950*e* and a programmable two-way radio system that operates at a very low power. The two-way radio system is comprised of a first, centralized, two-way radio transceiver 920 (hereinafter CLPRT), which is communicatively connected to the CRRC 620 through a bi-directional data link 931 and connected to the CRRS 640 through the transport means 330. The second radio comprising the two-way radio system is a component within the GPS control interface 950*e* (See FIG. 9B) and that two-way radio is provided with a transceiver antenna 972*e*. The GPS control interface 950*e* is component of the RRCMS 500 although it is a stand-alone element that can be physically located anywhere within the active DAS coverage area. Even though the GPS control interface 950*e* is not physically connected to the RRSCMS 500, it is communicatively connected to the RRCMS 500 through the two-way radio system. The two-way radio system is uniquely used to assist the CRRC 620 in determining the time delay that the radio channel resources emanating from the CBTS 800 would experience when being routed to the antennas of the active DAS site 20E. The two-way radio system is designed to route a time stamp signal that originates from the MCMS 600, through the existing active DAS infrastructure, and then into the remote GPS control interface 950*e*, where that same signal is then returned to the MCMS 600 along the exact same pathway. The operation of two-way radio system will be described in greater detail below. Those in the field are familiar with DAS infrastructures, knowing that they are typically comprised of a plurality of cellular wireless antennas (not shown) that are dispersed within the stadium that is identified in FIG. 8 as the active DAS site 20E, a DAS transmission means 202, a DAS interface 200 and the transmission means 233. The transport means 233 is matched to the format of the CRRS 640, which means that if the CRRS 640 is RF based, then transport means 233 is coaxial cable. If the CRRS 640 is fiber optic based, then the transport means would be a fiber optic cable.

Figure 9A:
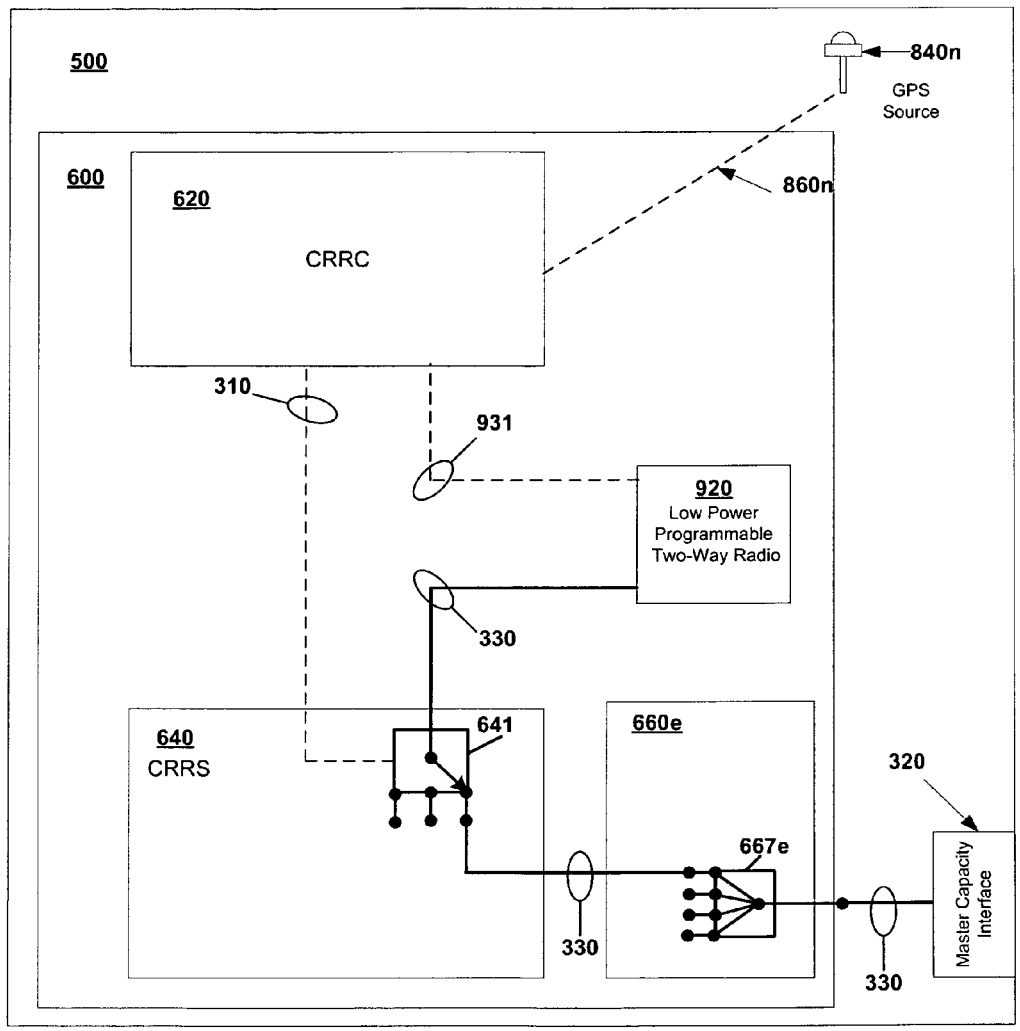
FIG. 9A is a diagrammatic representation emphasizing the routing of a GPS digital time stamp of a part of the GPS timing system that is incorporated as element of the radio resource capacity management system of the invention.
Figure 9B:
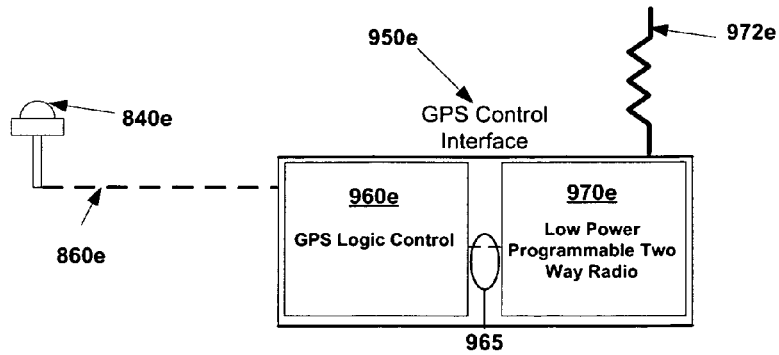
FIG. 9B is a diagrammatic representation of the GPS control interface and the GPS timing source unit that are stand alone components of the GPS timing system that is incorporated into the radio resource slave capacity management system of the invention of the present invention.

Referring to FIG. 9A, which is a detailed diagrammatic representation of the GPS time stamp compensation circuitry, the functionality of the time delay compensation process will be described. However, only the components that are necessary to explain the functionality are being presented in this figure. For example, the CRRS 640 only shows one switch and that switch is specifically used to accomplish the timing delay compensation although the CRRS 640 will be comprised of a multitude of switches (See FIG. 6B). Likewise, the conditioner 660*e* only shows a single combiner which is specifically used with respect to the timing delay compensation process. FIG. 9A shows that GPS timing source 840*n* is interfaced to the CRRC 620 via the bi-directional data link 860*n*. The timing source 840*n* will continuously transmit a digital timing data stream into the CRRC 620 even though the CRRC 620 will only use that information when it has determined that an active DAS site is in need of additional radio channel resources. Upon that determination, the CRRC 620 initiates its internal DAS software data timing program, which in turn, begins the differential timing delay computation process. Once the communications link is confirmed with the GPS timing source 840*e*, the CRRC 620 will register a time stamp from the timing data stream that it is receiving from the GPS timing source 840*n*, whereby it stores that registered time stamp and simultaneously creates a time stamp data packet which includes that registered time stamp. That data packet, being of a digital format, is then sent to the CLPRT 920 via the bi-directional data link 931, where the digital time stamp packet information is converted and/or modulated onto a narrow band RF frequency and this RF data packet signal is then transmitted out of the CLPRT 920 through the transport means 330 into the central compensation switch 641, which is strictly dedicated to the delay timing computation functions. The transport means 330 will either be a fiber optic or coaxial cable, depending upon the format of the CRRC 640. The RF data packet signal is then routed from the pole of switch 641 to its throw, which is dedicated the DAS site 20E. The RF data packet signal is then routed onto the dedicated transport means 330, which connects to the combiner 667*e* of the conditioner 660*e*. The RF data packet signal is then routed into the transport means 330 and into the master capacity interface 320 (hereinafter MCI), where it is then routed through the transport means 233, where it is then further routed into the DAS interface 220. From there, it is routed through the DAS transmission means 202 and then into the plurality of the antennas (not shown) that comprise the DAS network 20E within the stadium. Once the RF signal is radiated from these stadium antennae, that RF data packet signal is received by the antenna 972*e*, which is seen in FIG. 9B. Turning to FIG. 9B, it is seen that the antenna 972*e* is connected to the second or remote programmable two-way radio transceiver 970*e* (hereinafter RLPRT). The RLPRT 970*e* is a component of the remote GPS control interface 950*e*, which is further comprised of the GPS logic control processor 960*e* (hereinafter GLC). The GPS timing source 840*n* is communicatively connected to the GLC 960*e* via the bi-directional data link 860*e* and is continuously transmitting a digital timing data stream into the GLC 960*e*, which is essentially ignored until the exact moment in time that the time stamp data packet signal is received. The function of the interface 950*e*, specifically the antenna 972*e* and the RLPRT 970*e*, is to continuously monitor or scan a predetermined narrow band RF frequency that is within the service provider's frequency guard band. The narrow band RF frequency signal that is being monitored is actually the time stamp data packet that was modulated onto that narrow band RF frequency by the centralized programmable two-way radio transceiver 920 (CLPRT). Once the signal is detected and then received by antenna 972*e*, it is then passed to the RLPRT 970*e*, whereby the data that is contained within the signal is demodulated. At the moment of demodulation, the GLC 960*e* stores the digital timing stream time stamp from the GPS timing source 840*n*. The difference in time between the time stamp taken from the GPS timing source 840*e* and the time stamp that was within the demodulated signal, represents the time delay in reallocating the resources from CBTS 800 to the DAS site 20E. That time delay information can either be computed by the GLC 960*e* or the time stamp information that was gathered from GPS timing source 840*e* can be returned to the CRRC 620 so that it computes the time delay. In either case, the GLC 960*e* will generate a new digital time stamp data packet which contains it's GPS identification, and either the actual computed time delay (if computed by the GLC 960*e*), or the combination of the time stamp received from the GPS timing source 840*e* and the original time stamp data packet information that was demodulated by the RLPRT 970*e*. That new time stamp data packet is then communicated via the bi-directional data link 965, into the RLPRT 970*e*. The timing delay data packet is then modulated into an RF signal which is then radiated through the antenna 972*e* onto the same predetermined frequency as described earlier regarding operator frequency guard bands. That RF transmission is then received by the antennas that are located within the stadium of the DAS site 20E. From there, the signal travels through the exact DAS pathway and infrastructure and RRCMS pathways that were previously described in relation to the original data packet RF signal emanating from the CLPRT 920. Once the RF data packet signal is received within the CLPRT 920, it is then de-modulated into a digital signal, whereby that digital data packet signal is then communicated into the CRRC 620 via the bi-directional data link 931. Depending upon the information that was sent within the new data packet, the CRRC 620 may have to compute the time delay, or it will recognize the computed time delay for that DAS site, based upon the transmitted GPS timing source identification number that was part of the data packet. In that way, the CRRC 620 can distinguish which DAS site the time delay information is being received from. Based upon that information, the CRRC 620 then generates the appropriate system reconfiguration update commands which are then sent to and uploaded by the BSC 110. This uploaded command information is used by the BSC 110 to perform a respective system reconfiguration relating to the DAS site 20E and the respective sites which neighbor DAS site 20E in order to properly account for the transmission delay between the CBTS 800 and the DAS site 20E. As explained above, the CRRC 620 will continuously query the BSC 110 to ensure that system reconfiguration of BTS 20E has occurred within BSC 110, and once this confirmation has been acknowledged, the CRRC 620 will send command signals to the CRRS 640 to physically throw its switches in order to complete the circuitry that will facilitate the reallocation of the RF resources from CBTS 800 to DAS site 20E.

The RRCMS 500 of this fourth embodiment may also include an E911 system 940 and a remote monitoring and control system 900 that would be interfaced to the RRCMS 500 through the respective bi-directional data links 410 and 910. The E911 system 940 and the remote monitoring and control system 900 function exactly as described earlier herein with respect to FIG. 2A.

While the present invention is described in connection with what is presently considered to be most practical and preferred embodiments, it should be appreciated that the invention is not limited to the disclosed embodiments and is intended to cover various modifications and equivalent arrangements included within the spirit and scope of the claims. Modifications and variations in the present invention may be made without departing from the novel aspects of the invention as defined in the following claims.

I claim:

1. A capacity management system for allocating RF radio channel resources within a local cellular wireless communications network that is comprised of a plurality of macro and DAS sites, a base station controller, and respective backhaul transmission means that communicatively connect said base station controller to each of said macro and DAS sites, each of said macro and DAS sites having a respective base transceiver station, each of said base transceiver stations containing a plurality of RF radio channel resources that are available for reallocation to neighboring macro and DAS sites within said local network and to cellular wireless communications networks outside said local cellular wireless communications network, each of said radio channel resources connected to said base station controller through said backhaul transmission means and each of said respective backhaul transmission means having a pair of ends, each of said backhaul transmission means ends including an identical backhaul transport interface, said capacity management system comprising:

a radio resource capacity management system in communication with said base station controller through a bi-directional data link that continuously provides radio channel resource capacity data to said radio resource capacity management system, said radio resource capacity management system adapted to simultaneously reallocate the RF radio channel resources of the entire network to one or more macro and DAS sites within said network based on one of an external directive and an internal optimization analysis of said radio resource capacity data that is communicated from the base station controller via the bi-directional data link, wherein radio resource capacity requirements and radio resource capacity reserves of each site are determined as a part of said optimization analysis and wherein said external directive is based on predetermined radio resource capacity requirements of each site and wherein all reallocated radio channel resources will physically pass through said radio capacity management system;

a respective RF transmission means dedicated to each of said macro and DAS sites for connecting said radio resource capacity management system to each of said macro and DAS sites, said RF transmissions means facilitating the physical transfer of radio capacity resources into and out of said radio resource capacity management system as said radio resources are reallocated within said local cellular wireless communications network.

2. The capacity management system of claim 1, wherein said radio resource capacity management system further comprises a slave capacity management system and independent backhaul transport means dedicated to each macro and DAS site, each independent backhaul transport means having a pair of ends, with each of said ends having an identical independent backhaul transport interface associated therewith, one of said ends of each independent backhaul transport means connected to said radio resource capacity management system and the other said ends connected to one of a slave capacity management system and a respective backhaul transport means that is dedicated to a macro and DAS site, each slave capacity management system adapted to route and condition all radio channel resources that enter and leave its dedicated macro and DAS site to a signal format that is matched to that of the independent backhaul transport means that is dedicated to said dedicated macro and DAS site.

3. The capacity management system of claim 2, wherein the radio resource capacity management system is further comprised of a master capacity management system having a central radio resource controller, a central radio resource switch matrix and at least one conditioner, wherein said central radio resource controller is connected to said base station controller via said bi-directional data link and is connected to each respective slave capacity management systems via a respective control link and wherein said central radio resource controller is connected to said central radio resource switch matrix through a control circuitry and wherein the central radio resource switch matrix is connected to said at least one conditioner through a respective and identical transport connection.

4. The capacity management system of claim 3, wherein said at least one conditioner is connected to at least one of said slave capacity management systems through a respective said independent backhaul transport means.

5. The capacity management system of claim 2, wherein each said slave capacity management system and said base transceiver station that is dedicated to a macro and DAS site is connected together through a respective transmission means.

6. The capacity management system of claim 1, wherein said radio resource capacity management system further includes and is communicatively connected to a remote monitoring and control system through a bi-directional data link, wherein said monitoring and control system is adapted to receive local network data from said radio resource capacity management system and is further adapted to direct said radio resource capacity management system to reallocate radio channel resources within said network.

7. The capacity management system of claim 5, wherein each of said slave capacity management systems is comprised of a slave capacity management controller, a slave capacity management switch matrix and a slave capacity management conditioner, said switch matrix is in communication with and directed by said slave capacity management controller.

8. The capacity management system of claim 7, wherein each of said slave capacity management controllers are in communication with said central radio resource controller through a respective bi-directional control link, whereby said central radio resource controller solicits information from each of said slave capacity management controllers and selectively directs them to arrange their respective slave capacity management switch matrixes such that reallocated radio resource channels are one of removed from and added to a site.

9. The capacity management system of claim 8, wherein each of said slave capacity management RF conditioners is comprised of at least one of the components from the group consisting of a radio amplifier, an attenuator, a combiner, a coupler, a splitter, a circulator, a duplexer, an isolator, and a filter.

10. The capacity management system of claim 9, wherein said slave capacity management switch matrix is comprised of a plurality of switches and each switch is one of a RF switch and fiber optic switch and each switch has one of a plurality of inputs and outputs.

11. The capacity management system of claim 2, wherein said independent backhaul transport means dedicated to each macro and DAS site is one of a like and an unlike means, whereby a like means is of a same modulation format and an unlike means is of a different modulation format.

12. The capacity management system of claim 11, wherein each of the independent backhaul transport means and its associated backhaul transport interfaces are matched to a same modulation signal format.

13. The capacity management system of claim 12, wherein each of the independent backhaul transport means are one of the group consisting of a fiber optic cable, a coaxial cable, a point-to-point microwave link, a digital transport and an analog transport.

14. The capacity management system of claim 4, wherein said at least one conditioner of the radio resource capacity management system is connected to one of said backhaul transport interfaces of said independent backhaul transport means.

15. The capacity management system of claim 4, wherein said slave capacity management conditioner is in communication with said slave capacity management controller and is directed by said slave capacity management controller when a reallocated radio resource passes through said slave capacity management system and requires additional conditioning, said additional conditioning comprising one of attenuation and re-amplification.

16. The capacity management system of claim 1, wherein each of the respective RF transmission means is comprised of one of a fiber optic cable and a coaxial cable.

17. The capacity management system of claim 1, wherein said radio resource capacity management system further includes an emergency 911 system communicatively connected thereto.

18. The capacity management system of claim 6, wherein the central radio resource controller of said radio resource central management system is connected to said remote monitoring and control system through one of an internet connection and an internal network connection, whereby said remote monitoring and control system communicates said external directive to said radio resource management system through said central radio resource controller.

19. The capacity management system of claim 1, wherein said radio resource capacity management system is further comprised of a GPS time delay system which computes time delays that occur when radio channel resources are reallocated between macro and DAS sites within and outside of said local network.

20. The capacity management system of claim 19, wherein said GPS time delay system is comprised of at least one GPS timing source unit and at least one programmable two-way radio transceiver system, said at least one GPS timing source unit adapted to generate a digital time stamp signal that is communicated to said programmable two-way radio transceiver system.

21. The capacity management system of claim 20, wherein said programmable two-way radio transceiver system is comprised of a centralized two-way radio transceiver connected to said central radio resource switch via a transport means and to said central radio resource controller via a bi-directional data link.

22. The capacity management system of claim 21, wherein said GPS time delay system is further comprised of a respective remote programmable two-way radio transceiver incorporated into each said slave capacity management system within said local cellular wireless communications network and wherein said at least one GPS timing source unit is comprised of a respective GPS timing source unit associated with each respective slave capacity management system, each of said remote programmable two-way radio transceivers being communicatively connected to a respective slave capacity management controller via a respective and identical bi-directional data link and each of said GPS timing source units communicatively connected to a respective slave radio resource controller via a respective and identical bi-directional data link.

23. The capacity management system of claim 21, wherein said GPS time delay system is further comprised of a centralized GPS timing source unit that is associated with said master capacity management system.

24. The capacity management system of claim 22, wherein each of said radio transceivers of said two way radio system are adapted to convert and modulate a digital time stamp data packet that is created by said central radio resource controller onto an RF radio frequency.

25. The capacity management system of claim 23, wherein each of said radio transceivers of said two way radio system are adapted to convert and modulate a digital time stamp data packet that is created by said central radio resource controller onto an RF radio frequency.

26. The capacity management system of claim 23, wherein said GPS time delay system is further comprised of a remote programmable two-way radio, transceiver that is physically located within a coverage area of an active DAS site.

27. The capacity management system of claim 26, wherein each of said radio transceivers of said two way radio system are adapted to convert and modulate a digital time stamp data packet that is created by said central radio resource controller onto an RF radio frequency that operates within a guard band that is assigned to a service provider.

28. A capacity management system for allocating RF radio channel resources within a local cellular wireless communications network that is comprised of at least one DAS site that has a plurality of distributed antennae that are adapted to receive and radiate RF radio channel resources, each of said at least one passive and active DAS sites having dedicated DAS interface equipment associated therewith, said local cellular wireless communications network further including a base station controller communicatively connected with each of said at least one passive and active DAS sites through a respective bi-directional data link, said capacity management system comprising:

a radio resource capacity management system in communication with said base station controller through a first bi-directional data link that continuously provides radio resource capacity data to said radio resource capacity management system, said radio resource capacity management system including a centralized base transceiver station that is connected to said base station controller through a second bi-directional data link, said centralized base transceiver station comprised of a reservoir of RF radio channel resources, said radio resource capacity management system adapted to simultaneously reallocate one of all of and a part of said reservoir of RF radio channel resources to each of said at least one DAS sites within said network based on one of an external directive and an internal optimization analysis of said radio resource capacity data that is communicated from the base station controller via the first data link, wherein radio resource capacity requirements of each said at least one DAS site is determined as a part of said optimization analysis and wherein said external directive is based on predetermined radio resource requirements of each said at least one DAS site;

respective RF transmission means connecting said radio resource capacity management system to each said at least one DAS site, said RF transmission means facilitating the physical transfer of radio capacity resources into and out of said radio resource capacity management system as said radio resources are reallocated.

29. The capacity management system of claim 28, wherein the radio resource capacity management system is further comprised of a master capacity management system having a central radio resource controller, a central radio resource switch and at lease one conditioner, wherein said central radio resource controller is connected to said base station controller via said first data link and is connected to said central radio resource switch via a control link.

30. The capacity management system of claim 29, wherein the radio resource capacity management system further comprises a plurality of master capacity interfaces that facilitates the reallocation of said central RF radio resources from said centralized base transceiver station to each said at least one DAS site, the number of master capacity interfaces matched to the number of said at least one DAS sites.

31. The capacity management system of claim 30, wherein said at least one conditioner is connected to said central radio resource switch through a respective a transport means, which said transport means comprises one of a coaxial cable, fiber optic cable, and a printed circuit board.

32. The capacity management system of claim 31, wherein said central radio resource switch is comprised of a plurality of switches and each of said switches is comprised of one of the group consisting of an RF switch, a fiber optic switch, and a data switch, and each of said switches having one of a plurality of inputs and outputs.

33. The capacity management system of claim 32, wherein when the central radio resource switch is a RF switch, the transport means is a coaxial cable and each of the master capacity interfaces are of an RF format, and when said central radio resource switch is a fiber optic switch, the transport means is a fiber optic cable and each of the master capacity interfaces are of an optical format, and when said central radio resource switch is a data switch, the transport means is a printed circuit board and each of master capacity interfaces are of a data network format.

34. The capacity management system of claim 29, wherein the central radio resource controller is connected to a remote monitoring and control system through one of an internet connection and an internal network connection, whereby said remote monitoring and control system communicates said external directive to said radio resource management system.

35. The capacity management system of claim 31, wherein said at least one conditioner of said master capacity management system is comprised of at least one of the components from the group consisting of a radio amplifier, an attenuator, a combiner, a coupler, a splitter, a circulator, a duplexer, an isolator, and a filter.

36. The capacity management system of claim 35, wherein each of said at least one conditioners is further connected through a respective and identical bi-directional coaxial cable to one of an active DAS site and a passive DAS site.

37. The capacity management system of claim 36, wherein each of said DAS transport interfaces disposed between a respective said DAS site and a respective said at least one conditioner.

38. The capacity management system of claim 28, wherein said radio resource management system further includes an emergency 911 system, said emergency 911 system connected to said central radio resource controller through a bi-directional data link.

39. The capacity management system of claim 30, wherein when said local cellular wireless communications network is comprised of at least one active DAS site, said central radio resource management system is further comprised of a GPS time delay system which computes time delays that occur when radio channel resources are reallocated from said centralized base transceiver station to said active DAS sites within and outside of said local network.

40. The capacity management system of claim 39, wherein said GPS time delay system is comprised of a programmable two-way radio transceiver system, a centralized GPS timing source, and a remote GPS timing source and associated GPS control interface dedicated to each active DAS site within said local cellular wireless communications network.

41. The capacity management system of claim 40, wherein said centralized GPS timing source is in communication with said central radio resource controller via a bi-directional data link and wherein each of said remote GPS timing sources are in communication with their associated said GPS control interfaces via a respective and identical bi-directional data link.

42. The capacity management system of claim 41, wherein said programmable two-way radio transceiver system is comprised of a centralized transceiver radio and a respective and identical remote transceiver radio dedicated to each active DAS site within said local cellular wireless communications network, said centralized transceiver radio connected to said central radio resource switch via a transport means and to said central radio resource controller via a bi-directional data link, each of said remote transceiver radios comprising a physically independent component from that of said radio resource management system, each of said remote transceiver radios in close physical proximity to the active DAS site to which it is dedicated.

43. The capacity management system of claim 42, wherein each respective remote transceiver radio is a component of an associated said GPS control interface, whereby each said GPS control interface further includes a respective GPS logic controller that is communicatively connected to its associated said remote radio transceiver via a respective and identical bi-directional data link, each of said remote radio transceivers having an identical transceiver antenna attached thereto.

44. The capacity management system of claim 43, wherein each of said radio transceivers of said two way radio system are adapted to convert and modulate a digital time stamp data packet that is created by said central radio resource controller onto an RF radio frequency that operates within a guard band that is assigned to a service provider.

45. The capacity management system of claim 44, wherein said radio antenna of each remote radio transceiver is adapted to radiate and receive a RF radio frequency signal to and from the distributed antennas of said active DAS site to which said remote radio transceiver is dedicated.

46. The capacity management system of claim 45, wherein said radio resource capacity management system further includes and is communicatively connected to a remote monitoring and control system through a bi-directional data link, wherein said monitoring and control system is adapted to receive local network data from said radio resource capacity management system and is further adapted to direct said radio resource capacity management system to reallocate radio channel resources within said network.

47. A method of allocating RF radio channel resources within a local cellular wireless communications network that is comprised of a plurality of macro and DAS sites, a base station controller, and respective backhaul transmission means that communicatively connects said base station controller to each of said macro and DAS sites, each of said macro and DAS sites having a respective base transceiver station that is indirectly connected to said base station controller such that said base station controller continuously monitors and stores a variety of metrics related to a quality of cellular service within each of said macro and DAS sites, each of said base transceiver stations containing a plurality of RF radio channel resources that are available for reallocation to neighboring macro and DAS sites within said local network and to cellular wireless communications networks outside said local cellular wireless communications network, each of said radio channel resources connected to said base station controller through said backhaul transmission means and each of said respective backhaul transmission means having a pair of ends, each of said backhaul transmission means ends including an identical backhaul transport interface, said method comprising the steps of:

providing a radio resource capacity management system and then interfacing that system into said local cellular wireless communications network by communicatively connecting said base station controller to said radio resource capacity management system through a bi-directional data link;

utilizing the radio resource capacity management system to continuous monitor predetermined metric information stored within said base station controller to determine which macro and DAS sites are operating at a predetermined threshold level of quality of cellular service and then identifying those sites that are operating under the predetermined threshold level as sites requiring additional RF radio channel resources, said macro and DAS site which requires additional RF radio channel resources identified by said radio resource capacity management system as a target site;

utilizing said radio resource capacity management system to simultaneously monitor said predetermined metric information stored within said base station controller to determine which macro and DAS sites are operating above said predetermined threshold level and which have redundant RF radio channel resources available for reallocation, then determining an amount of redundant RF radio channel resource capacity that each of said macro and DAS sites has available, and then determining which said macro and DAS site has the greatest available redundant RF radio channel capacity and then identifying that site as a donor site;

sending a command signal from said radio resource capacity management system to said base station controller, whereby said command signal instructs said base station controller to isolate the available redundant radio resources from further system use;

utilizing the radio resource capacity management system to route the available RF radio channel resources through said radio resource capacity management system where said RF radio channel resources are conditioned prior to reallocation to said target site.

48. The method of claim 47, further including the step of computing a time delay and then incorporating said time delay as part of said conditioning of said RF radio channel resources, wherein said time delay represents a time in nanoseconds for said reallocated RF radio channel resources to travel from said donor site to said target site.

49. The method of claim 47, wherein the step of conditioning the reallocated RF radio channel resources comprises at least one of the group consisting of amplification, attenuation, combining, splitting, duplexing, isolating, circulating, and filtering.

50. The method of claim 47, further including the step of interfacing an emergency 911 system into the said radio resource capacity management system and then incorporating emergency 911 call source information into the base transceiver station associated with said target site prior to said RF radio channel resources being reallocated to said target site so that a 911 emergency call is routed to a 911 dispatch center from where said 911 emergency call originated and not to a 911 dispatch center within an area where reallocated resources were routed.

51. The method of claim 50, wherein said radio resource capacity management system is comprised of a slave capacity management system and independent backhaul transport means dedicated to each macro and DAS site, each independent backhaul transport means having a pair of ends, with each of said ends having an identical independent backhaul transport interface associated therewith, one of said ends of each independent backhaul transport means connected to said radio resource capacity management system and the other said ends connected to one of a slave capacity management system and a respective backhaul transport means that is dedicated to a macro and DAS site, each slave capacity management system adapted to route and condition all radio channel resources that enter and leave its dedicated macro and DAS site to a signal format that is matched to that of the independent backhaul transport means that is dedicated to said dedicated macro and DAS site.

52. The method of claim 51, wherein said radio resource capacity management system is further comprised of a master capacity management system having a central radio resource controller, a central radio resource switch matrix and at least one conditioner, wherein said central radio resource controller is connected to said base station controller via said bi-directional data link and is connected to each respective slave capacity management systems via a respective control link and wherein said central radio resource controller is connected to said central radio resource switch matrix through a control circuitry and wherein the central radio resource switch matrix is connected to said at least one conditioner through a respective and identical transport connection.

* * * * *